United States Patent
Ohba

(10) Patent No.: US 10,866,832 B2
(45) Date of Patent: Dec. 15, 2020

(54) WORKFLOW SCHEDULING SYSTEM, WORKFLOW SCHEDULING METHOD, AND ELECTRONIC APPARATUS

(71) Applicant: TOSHIBA MEMORY CORPORATION, Tokyo (JP)

(72) Inventor: Yoshihiro Ohba, Tokyo (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 148 days.

(21) Appl. No.: 16/120,404

(22) Filed: Sep. 3, 2018

(65) Prior Publication Data

US 2019/0213040 A1    Jul. 11, 2019

(30) Foreign Application Priority Data

Jan. 9, 2018    (JP) .................................. 2018-001411

(51) Int. Cl.
  *G06F 9/48*    (2006.01)
  *G06F 9/38*    (2018.01)
  *G06F 9/52*    (2006.01)

(52) U.S. Cl.
  CPC .......... *G06F 9/4881* (2013.01); *G06F 9/3885* (2013.01); *G06F 9/3891* (2013.01); *G06F 9/52* (2013.01); *G06F 9/526* (2013.01)

(58) Field of Classification Search
  CPC ...... G06F 9/4881; G06F 9/3885; G06F 9/526; G06F 9/3891; G06F 9/52
  See application file for complete search history.

(56) References Cited

U.S. PATENT DOCUMENTS

| | | | |
|---|---|---|---|
| 7,370,325 B1* | 5/2008 | Hull | G06F 9/4843 |
| | | | 718/102 |
| 2016/0217003 A1* | 7/2016 | Ailamaki | G06F 40/205 |
| 2018/0018206 A1* | 1/2018 | Stall | G06F 12/0261 |
| 2019/0114350 A1* | 4/2019 | Shi | G06F 9/3855 |

FOREIGN PATENT DOCUMENTS

JP    2019-101450 A    6/2019

OTHER PUBLICATIONS

C. Pautasso and G. Alonso, "Parallel computing patterns for grid workflows," presented at the HPDC Workshop Workflows Support LargeScale Sci. (WORKS), Paris, France, 2006 (Year: 2006).*
Zhifeng Yu, Toward Practical Multi-Workflow Scheduling in Cluster and Grid Environments, Dissertation, Submitted to the Graduate School of Wayne State University, Detroit, Michigan, 2009, 149 pages, http://www.cs.wayne.edu/~weisong/papers/yu08-dissertation.pdf.

* cited by examiner

*Primary Examiner* — Jacob D Dascomb
(74) *Attorney, Agent, or Firm* — Kim & Stewart LLP

(57) ABSTRACT

A workflow scheduling system includes a first processor configured to schedule a plurality of workflows each including a plurality of tasks; a plurality of second processors configured to form a predetermined number of logical computation units and execute the scheduled workflows in parallel; and a memory that stores information about a plurality of task groups each of which includes one or more tasks from one or more of the workflows. The first processor is configured to, based on the stored information, instruct the second processors to execute the scheduled workflows while limiting a total number of the workflows simultaneously executed by the second processors to the predetermined number for each of the task groups.

18 Claims, 17 Drawing Sheets

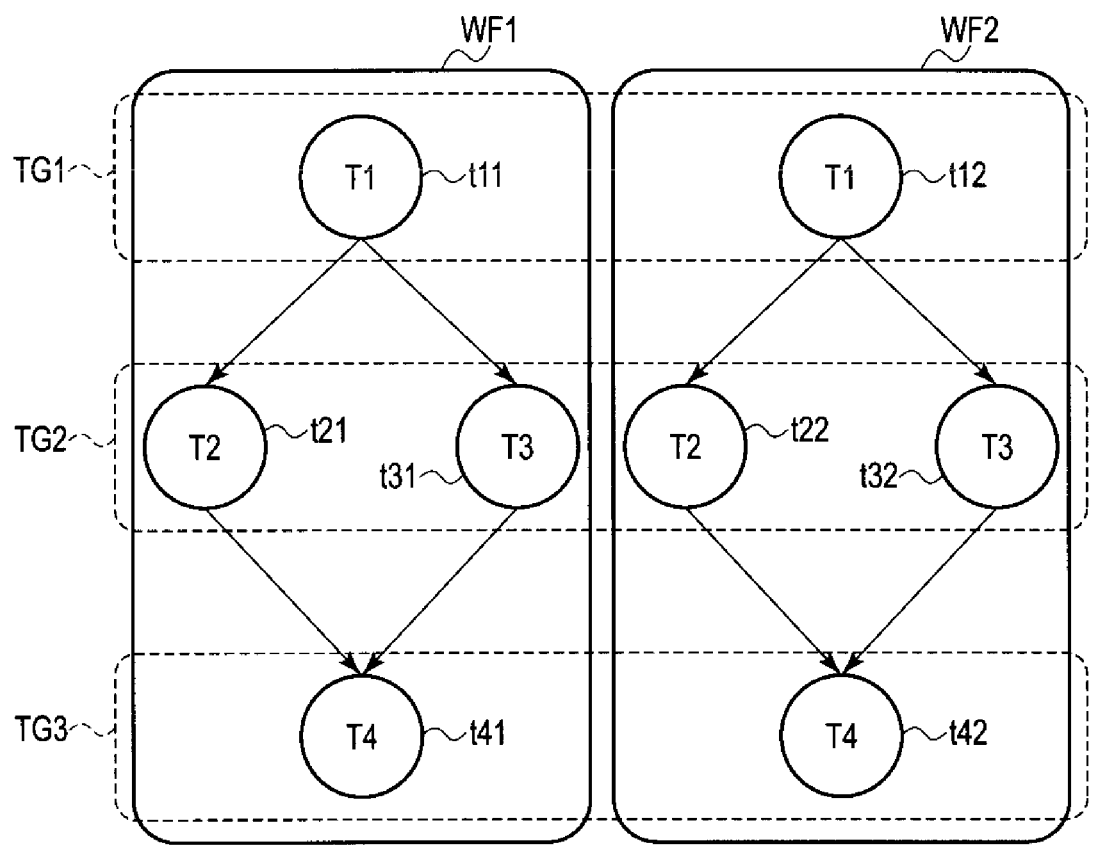

FIG. 7

| PERIOD OF TIME [start, end] | WORKFLOW SCHEDULING RESULT {WF NUMBER} ||| TASK SCHEDULING RESULT {TASK ID → (COMPUTATION NODE ID, RESOURCES)} |||| PROCESS COMPLETION WF AT TIME OF ENDING PERIOD OF TIME {WF NUMBER} |
|---|---|---|---|---|---|---|---|---|
| | TG[1] | TG[2] | TG[3] | WF[1] | WF[2] | WF[3] | WF[4] | |
| [0, T] | {1} | | | {t1→(1,1,1)} | | | | (Z11) |
| [T, 2T] | {2} | {1} | | {t2→(1,2,1), t3→(1,2,1)} | {t1→(1,1,1)} | | | (Z12) |
| [2T, 3T] | {3} | {2} | {1} | {t4→(1,1,1)} | {t2→(1,2,1), t3→(1,2,1)} | {t1→(1,1,1)} | | (Z13) {1} |
| [3T, 4T] | {4} | {3} | {2} | | {t4→(1,1,1)} | {t2→(1,2,1), t3→(1,2,1)} | {t1→(1,1,1)} | (Z14) {2} |
| [4T, 5T] | | {4} | {3} | | | {t4→(1,1,1)} | {t2→(1,2,1), t3→(1,2,1)} | (Z15) {3} |
| [5T, 6T] | | | {4} | | | | {t4→(1,1,1)} | (Z16) {4} |

FIG. 8

| PERIOD OF TIME [start, end] | WF SCHEDULING RESULT {WF NUMBER} ||| TASK SCHEDULING RESULT {TASK ID → (COMPUTATION NODE ID, RESOURCES)} |||| PROCESS COMPLETION WF AT TIME OF ENDING PERIOD OF TIME {WF NUMBER} |
|---|---|---|---|---|---|---|---|---|
| | TG[1] | TG[2] | TG[3] | WF[1] | WF[2] | WF[3] | WF[4] | |
| [0, T] | {1,2} | | | {t1→(1.1,1)} | {t1→(2.1,1)} | | | |
| [T, 2T] | {3,4} | {1,2} | | {t2→(1.2,1), t3→(1.2,1)} | {t2→(2.2,1), t3→(2.2,1)} | {t1→(1.1,1)} | {t1→(2.1,1)} | |
| [2T, 3T] | | {3,4} | {1,2} | {t4→(1.1,1)} | {t4→(2.1,1)} | {t2→(1.2,1), t3→(1.2,1)} | {t2→(2.2,1), t3→(2.2,1)} | {1,2} |
| [3T, 4T] | | | {3,4} | | | {t4→(1.1,1)} | {t4→(2.1,1)} | {3,4} |

US 10,866,832 B2

WORKFLOW SCHEDULING SYSTEM, WORKFLOW SCHEDULING METHOD, AND ELECTRONIC APPARATUS

CROSS-REFERENCE TO RELATED APPLICATION

This application is based upon and claims the benefit of priority from Japanese Patent Application No. 2018-001411, filed Jan. 9, 2018, the entire contents of which are incorporated herein by reference.

FIELD

Embodiments described herein relate generally to a scheduling technology in a computer.

BACKGROUND

Scheduling technologies have been developed for a computer to execute multiple jobs properly and efficiently. The scheduling technologies allow the computer to determine which computer resources (e.g., processors or processor cores) should be used for which jobs at which time.

In such scheduling technologies, there are two known performance indicators: a throughput, which indicates the total number of processed jobs per unit time; and a processing completion time, which indicates a time period for completing all jobs.

In general, it is beneficial to schedule the jobs so as to maximize the throughput while minimizing the processing completion time. However, there is a trade-off between these factors. For example, when the scheduler allocates full computer resources to process the jobs one by one, the throughput would be increased, but the completion time could be lengthened. On the other hand, when the scheduler processes all of the jobs in parallel, the completion time would be shortened, but the throughput may be decreased.

DESCRIPTION OF THE DRAWINGS

FIG. 2 is a diagram illustrating an example of WFDAG according to an embodiment.

FIG. 3 is a diagram illustrating an example of task group definition according to an embodiment.

FIG. 7 is a diagram illustrating a first example of a scheduling result according to an embodiment.

FIG. 8 is a diagram illustrating a second example of a scheduling result according to an embodiment.

DETAILED DESCRIPTION

Figure 1:
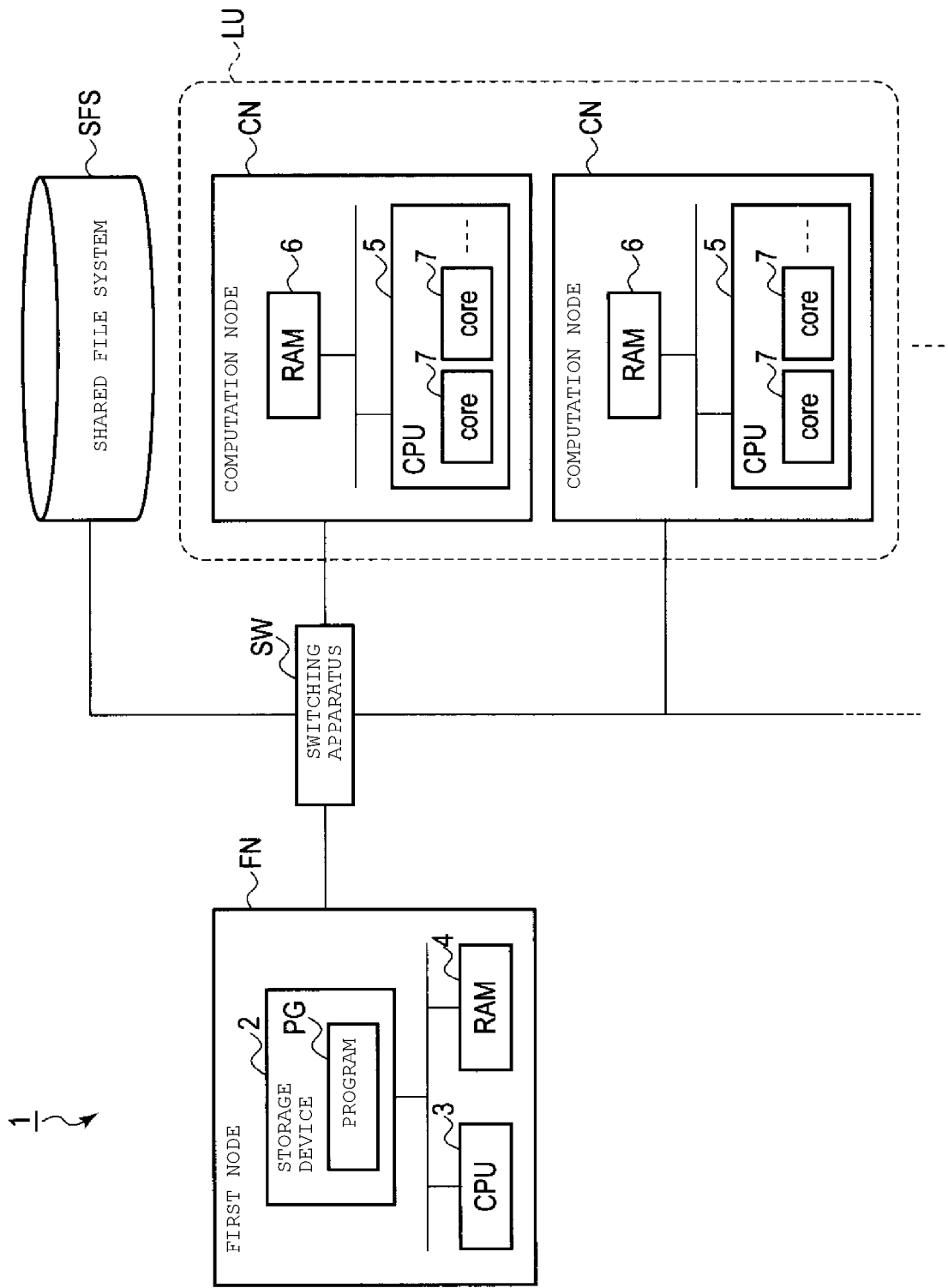
FIG. 1 is a block diagram illustrating an example of a computer system according to an embodiment.

Embodiments provide a workflow scheduling system, a workflow scheduling method, and an electronic apparatus obtaining a high throughput in a short processing completion time.

In general, according to one embodiment, a workflow scheduling system includes a first processor configured to schedule a plurality of workflows each including a plurality of tasks; a plurality of second processors configured to form a predetermined number of logical computation units and execute the scheduled workflows in parallel; and a memory that stores information about a plurality of task groups each of which includes one or more tasks from one or more of the workflows. The first processor is configured to, based on the stored information, instruct the second processors to execute the scheduled workflows while limiting a total number of the workflows simultaneously executed by the second processors to the predetermined number for each of the task groups.

Hereinafter, each embodiment will be described with reference to the drawings. In the following description, the same reference numerals are given to substantially and practically the same function and constituent elements and the description thereof will be described as necessary.

In an embodiment, a configuration of a computer system and a scheduling process executed by a multi-workflow scheduling system operating on the computer system will be described.

In an embodiment, a workflow (WF) describes a procedure for processing jobs by the computer system. The workflow defines a series of processes starting from input of an initial input file set and ending with output of a final output file set. For example, one job processed by the computer system is described by one workflow. The workflow is executed using, for example, a snakemake program. Since the snakemake program is disclosed in "Johannes Koester, "Welcome to Snakemake's documentation!", [online], 2016, [searched on 5 Jan. 2018], Internet <https://snakemake.readthedocs.io/en/stable/>", the detailed description thereof will be omitted herein.

In an embodiment, a processing unit of the workflow is a task. Each task is executed on a computation node to be described below. An initial input file or an intermediate file may be input to the task, and a final output file or an intermediate file may be output from the task.

FIG. 1 is a block diagram illustrating an example of a computer system 1 according to an embodiment.

The computer system 1 includes a first node FN, a shared file system SFS, and a plurality of computation nodes CN. The first node FN, the shared file system SFS, and the plurality of computation nodes CN are connected to and communicate with each other.

The first node FN is, for example, an electronic apparatus that controls the whole computer system 1. The first node FN includes a user interface of the computer system 1. For example, a user inputs a workflow desired to be processed with regard to the first node FN to the computer system 1 and obtains a processing result of the workflow via the first node FN.

The first node FN includes a storage device 2, a central processing unit (CPU) 3, and a random access memory (RAM) 4 serving as a main storage device. The storage device 2, the CPU 3, and the RAM 4 are connected by an internal bus to communicate with each other. In an embodiment, the storage device 2 is a hard disk, a solid-state device (SSD), or a flash memory. The storage device stores a program PG. The first node FN operates as a multi-workflow scheduling system to be described later, by causing the CPU 3 to execute the program PG stored in the storage device 2.

In an embodiment, the CPU 3 may be another processor such as a micro processing unit (MPU) or a digital signal processor (DSP).

The shared file system SFS is a storage device shared by the first node and the plurality of computation nodes CN. The shared file system SFS stores an input file and an output file necessary for processing each task.

The computation node CN is, for example, an electronic apparatus that includes resources such s a CPU 5 and a RAM 6. The CPU 5 includes, for example, at least one core 7. The computation node CN executes a process for a workflow using resources included in the computation node CN in response to an instruction from the program PG.

One computer system 1 may include the plurality of computation nodes CN. In this case, the computer system 1 forms, for example, a computer cluster.

Here, the computer cluster is a system in which the plurality of computation nodes CN is combined to be bundled. One computer cluster includes, at least one logical unit (LU). Each logical unit LU includes at least one computation node CN.

When there is the plurality of computation nodes CN, the number of cores 7 provided in the CPU 5 of each computer node CN may be different for each computation node CN.

One electronic apparatus may include the plurality of computation nodes CN. The computation nodes CN provided in one logic unit LU may be provided in other electronic apparatuses. For example, as illustrated in FIG. 1, two computation nodes CN which are different electronic apparatuses can form one logical unit LU. A plurality of single logical units may be provided in one electronic apparatus. That is, the plurality of logical units LU may be formed by the plurality of computation nodes CN provided in one electronic apparatus.

Each of the above-described apparatuses is connected to, for example, a switching apparatus SW. For example, the first node FN can be enabled to communicate with any apparatus by operating the switching apparatus SW and switching connection between the electronic apparatuses provided in the computer system 1.

When a workflow is input to the first node FN, the program PG allocates each task included in the workflow to the cores 7 of at least one computation node CN. The computation node CN processes the allocated tasks. When the tasks included in the workflow are all processed, a processing result of the workflow can be obtained.

In an embodiment, a process for allocating the resources on a specific computation node to certain tasks is referred to as task scheduling.

FIG. 2 is a diagram illustrating an example of a workflow directed acyclic graph (WFDAG) according to an embodiment.

The WFDAG is a directed acyclic graph in which processing units of a workflow (i.e., tasks) are represented by vertexes, and dependencies between tasks according to input and output files are represented by sides. Each vertex (that is, each task) of the WFDAG has a unique identifier in the WFDAG. For any two vertexes (vertexes a and b) of the WFDAG, the task of the vertex a and the task of the vertex b can be executed in parallel (that is, simultaneously) when there is no route from the vertex a to the vertex b or there is no route from the vertex b to the vertex a.

The WFDAG includes a partial sub-directed acyclic graph (DAG) which is a partial graph. When the partial DAG includes two or more vertexes, any two vertexes (the vertexes a and b) of the partial DAG correspond to one of a case in which there is a route from the vertex a to the vertex b or from the vertex b to the vertex a in the partial DAG or a case in which there is no route from the vertex a to the vertex b or from the vertex b to the vertex a in the partial DAG and the WFDAG.

For example, in the example of FIG. 2, a workflow WF1 includes a task t11 with a task name "T1", a task t21 with a task name "T2", a task t31 with a task name "T3", and a task t41 of a task name "T4". Similarly, a workflow WF2 includes a task t12 with the task name "T1", a task t22 with the task name "T2", a task t32 with the task name "T3", and a task t42 of the task name "T4". The tasks t11 and t12 are the same tasks; the tasks t21 and t22 are the same tasks; the tasks t31 and t32 are the same tasks; and the tasks t41 and t42 are the same tasks. In the workflow WF1, the tasks t11, t21, t31, and t41 are partial DAGs of the WFDAG indicating the workflow WF1. Similarly, in the workflow WF2, the tasks t12, t22, t32, and t42 are partial DAGs of the WFDAG indicating the workflow WF2.

In an embodiment, each task included in a workflow takes the following four states, an "executable standby state", an "executable state", an "execution progress state", and an "execution end state". The executable standby state refers to a state in which input files necessary to execute the task are not ready. The executable state refers to a state in which all the input files necessary to execute the task are ready and the task is not in the execution progress state and the execution end state. That is, the executable state refers to a state immediately before execution. The execution progress state refers to a state in which the task is being executed. The execution end state refers to a state in which the execution of the task ends.

FIG. 3 is a diagram illustrating an example of a task group definition table according to an embodiment.

In an embodiment, a set of the tasks included in the partial DAG is referred to as a task group (TG). The same tasks belonging to different workflows can belong to the same task group.

The task group definition table is data in which tasks are associated with task groups. FIG. 3 illustrates an example of task groups included in the workflows WF1 and WF2 in FIG. 2. The computer system 1 stores the task group definition table in, for example, the shared file system SFS or the RAM 4.

In the example of FIG. 2, since the task t11 included in the partial DAG of the workflow WF1 and the task t12 included in the partial DAG of the workflow WF2 are the same task with the task name "T1", the tasks t11 and t12 can be included in the same task group. That is, the task group TG1 includes the task with the task name "T1". Similarly, the task group TG2 includes the tasks with the task names "T2" and "T3". Similarly, the task group TG4 includes the task with the task name "T4".

In the workflows WF1 and WF2 illustrated in FIG. 2, the following different task groups may be defined. For example, the first partial DAG of the workflow WF1 includes the task t11 and the second partial DAG includes the tasks t21, t31, and t41. Similarly, the first partial DAG of the workflow WF2 includes the task t12 and the second partial DAG includes the tasks t22, t32, and t42. In this case, in both the workflows WF1 and WF2, since there are the partial DAGs formed by the task names "T2" and "T3"' and the task name "T4", the partial DGAs can be set as the same task group. That is, in this example, the task group TG1 includes the task with the task name "T1" and the task group TG2 includes the tasks with the task names "T2", "T3", "T4".

Hereinafter, multi-workflow task scheduling will be described. The multi-workflow task scheduling refers to a process for allocating resources of a predetermined computation node CN in the computer system (that is, the computer cluster) to tasks included in each workflow and executing the tasks in a predetermined procedure or generating an execution plan of the tasks, for example, when P (where P is plural) workflows are processed.

As described above, performance of the computer system is generally expressed in accordance with a throughput and a processing completion time. In an embodiment, in the computer system 1, the number of workflows completely processed per predetermined time (hereinafter referred to as a regular processing throughput) and a time in which a process is completed for all the workflows (hereinafter referred to as a whole processing completion time) each satisfy predetermined conditions to be described below.

Here, T_sum is a maximum time required to process all the tasks of the workflow using one logical unit LU. T_sum is expressed by Expression (1) below using a time T(i) required to process all the tasks belonging to a task group i using one logical unit LU and a total number G of task groups. In Expression (1), resources allocated for each task group are assumed not to overlap with each other. That is, the allocated resources do not share the same tasks and are different from each other.

$$T\_sum = \Sigma T(i)(1 \leq i \leq G) \quad (1)$$

When N_lu is the number of logical units LU provided in the computer system 1, a regular processing throughput of the computer system 1 according to an embodiment is equal to or greater than N_lu per T_max, which is the maximum value of a processing time of one task group and expressed in Expression (2) below.

$$T\_max = \max\{T(i) | 1 \leq i \leq G\} \quad (2)$$

A whole processing completion time of the computer system 1 according to an embodiment is, for example, a value expressed in Expression (3) below using the number of workflows P, the number of logical units N_lu, the maximum value of the processing time of one task group T_max, and the maximum time taken to process all the tasks of the workflow T_sum. In other words, a target performance of the whole processing completion time according to an embodiment is a value expressed in Expression (3).

$$T\_sum + T\_max \cdot \frac{P - N\_lu}{N\_lu} \text{ (UnitTime)} \quad (3)$$

Expression (3) indicates that a time until a processing result of the workflow is first output is T_sum and subsequently a processing result of the workflow is obtained for each predetermined time computed based on the number of the logical unit N_lu.

Hereinafter, first to third examples of general multi-workflow task scheduling will be described.

In the first example of the multi-workflow task scheduling, a plurality of workflows are processed without distinction of the computer system (hereinafter this scheme is a referred to as flat scheduling). In the flat scheduling, the number of workflows P is simultaneously processed at any time point. As a result, the processing results of all the workflows can be obtained at the same time, but the regular processing throughput is not satisfied.

More specifically, for example, the number of workflows P is set to 4, the number of logical units N_lu is set to 1, the maximum value of the processing time of one task group T_max is set to T, and the total number of task groups G is set to 3. The types of tasks included in each workflow and the definition of the task group have been described with reference to FIGS. 2 and 3. It is assumed that one logical unit LU includes two computation nodes and one computation node includes two cores 7. When each task is processed for a processing time T using one core 7, the whole processing completion time in the flat scheduling is 4T and a processing result of all the workflows at an elapsed time of 4T can be obtained.

Here, the whole processing completion time computed using Expression (3) is 6T. Accordingly, the whole processing completion time of the flat scheduling is equal to or less than a value of Expression (3) and satisfies a target performance of the whole processing completion time. On the other hand, the regular processing throughput is 1 workflow/T. Since the processing result of the workflow until the elapsed time of 4T is not output in the above-described flat scheduling, the target performance of the regular processing throughput is not satisfied.

In the second example of the multi-workflow task scheduling, the task scheduler controlling the above-described flat scheduling executes control such that the number of workflows input between the maximum value of the processing time of one task group T_max is equal to or less than the number of logical units N_lu. In the second example, however, centralized control is necessary. Therefore, for example, application to a task scheduler distributed on a plurality of systems via a network (hereinafter referred to as a distributed task scheduler) is difficult. When different types of workflows are mixed, the maximum value of the processing time of one task group T_max depends on the workflow that requires a larger amount of calculation. Therefore, when a ratio of workflows that require less calculation is high, utilization efficiency of the system may be lowered.

In the third example of the multi-workflow task scheduling, the task scheduler calculates priority of each task in real time using the workflow definition (WFDAG) of each task and allocates resources in the order of high rank of executable tasks (see Zhifeng Yu, "TOWARD PRACTICAL MULTI-WORKFLOW SCHEDULING IN CLUSTER AND GRID ENVIRONMENTS", [online], May 2009, [searched on 5 Jan. 2018], Internet <URL:http://www.cs.wayne.edu/~weisong/papers/yu08-dissertation.pdf>). In the third example, however, a computation amount of the task scheduler may depend on the number of workflows and the workflow definition.

Accordingly, in an embodiment, two stage multi-workflow task scheduling is executed using the task scheduler and the following workflow scheduler.

In the first stage, the workflow scheduler schedules the workflows to computer resources while limiting the number of types of workflows including tasks in an execution progress state being equal to or less than the number of logical units N_lu for each task group. For this control, the computer system 1 may define a semaphore for each task group.

Here, each semaphore includes, for example, a semaphore variable indicating the number of workflow which can be simultaneously executed and a semaphore queue managing a processing standby workflow. An initial value of each semaphore counter is the number of the logical unit N_lu.

The workflow scheduler issues a P command to a semaphore of a task group included in a certain workflow when the task group enters the executable state. The semaphore receiving the P command decreases one semaphore variable. The workflow scheduler transmits the executable task of the task group to the task scheduler.

The workflow scheduler issues a V command to the semaphore of the task group included in a certain workflow when the task group enters the execution end state. The semaphore receiving the V command increases one semaphore variable.

When the semaphore variable becomes negative, there is a processing standby workflow in the semaphore queue.

In an embodiment, first in first out (FIFO) may be provided according to priority of the workflows instead of the semaphore queue. In this case, the computer system 1 may select the FIFO dequeued based on the priority.

In the second stage, the task scheduler executes the task by allocating predetermined resources to the executable task received from the workflow scheduler. The resources allocated to each task group are assumed not to overlap with each other. That is, the allocated resources do not share the same tasks and are different from each other.

When the number of logical units N_lu is equal to 1, a mutex can be used instead of the above-described semaphore. The details of a use example of the semaphore and the mutex will be described later.

In an embodiment, the computer system 1 obtains regular throughputs equal to or greater than N_lu per T_max and the whole processing completion time equal to or less than the value indicated in Expression (3) through the multi-workflow task scheduling using the workflow scheduler and the task scheduler. In the multi-workflow task scheduling according to an embodiment, a computation amount does not depend on the number of workflows and the workflow definition. Even when the different types of workflows are included, utilization efficiency of the resources does not deteriorate. Further, the same can also apply to a distributed task scheduler.

Figure 4:
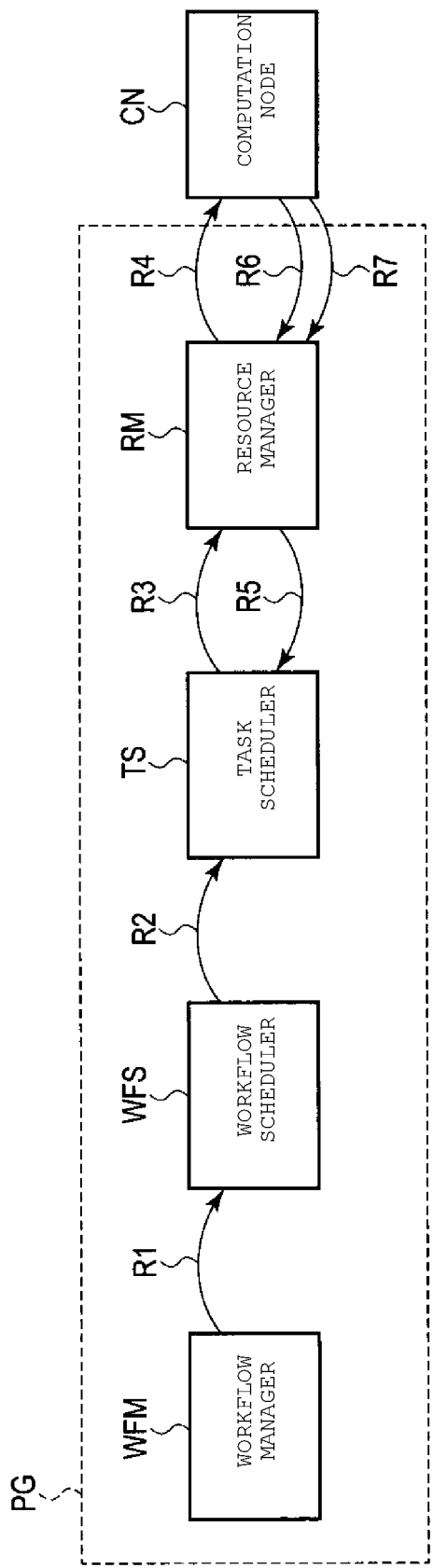
FIG. 4 is a diagram illustrating an example of a multi-workflow scheduling system according to an embodiment.

FIG. 4 is a diagram illustrating an example of a multi-workflow scheduling system according to an embodiment. In an embodiment, the multi-workflow scheduling system is implemented by, for example, the program PG.

The multi-workflow scheduling system includes a workflow manager WFM, a workflow scheduler WFS, a task scheduler TS, a resource manager RM, and a computation node CN.

The workflow manager WFM manages a task state of the tasks included in each workflow based on WFDAG information stored in the shared file system SFS or RAM 4. The workflow manager WFM transmits a task execution request R1 including information regarding each executable task of each workflow to the workflow scheduler WFS.

The task execution request R1 includes, for example, a task identifier with which a task can be uniquely identified in the workflow scheduler WFS, a task name with which a task can be uniquely identified in the workflow, and a script which can be executed on the computation node CN at the time of execution of a task.

The task execution request R1 may designate a resource request amount. When a transmission destination of the task execution request R1 can access a resource request designation table, the designation of the resource request amount can be omitted. Here, the resource request destination table is data with which a resource request amount used for processing the task is designated for each task name. For example, when the resource request amount is represented by the number of CPU cores, the task name and the number of CPU cores are associated in the resource request destination table. The resource request amount includes at least one item among, for example, a minimum number of CPU cores, the number of maximum CPU cores, a minimum memory amount (unit: MB), a maximum memory amount (unit: MB), a minimum I/O read speed (unit: MBps), a maximum I/O read speed (unit: MBps), a minimum I/O write speed (unit: MBps), and a maximum I/O write speed (unit: MBps). The computer system 1 stores the resource request designation table in, for example, the shared file system SFS or the RAM 4.

The workflow manager WFM is implemented by, for example, the above-described snakemake program. In one multi-workflow scheduling system, there may be a plurality of workflow managers WFM.

The workflow scheduler WFS executes the workflow scheduling using the semaphore or the mutex, for example, for each task group, as described above. The workflow scheduler WFS selects a task to be executed (hereinafter referred to as an execution task) from the tasks designated with the task execution request R1 received from the workflow manager WFM. The workflow scheduler WFS transmits a task execution request R2 for the execution task to the task scheduler TS.

The workflow scheduler WFS is, for example, a cluster command designated with a cluster option of the above-described snakemake program. In one multi-workflow scheduling system, there may be a plurality of workflow schedulers WFS. For example, each workflow scheduler WFS may receive the task execution requests R1 from the plurality of workflow managers WFM.

The workflow scheduler WFS may be located on a plurality of operating systems (OS). In other words, the workflow scheduler WFS can operate on a distributed system. In this case, the workflow scheduler WFS may further have a function of a distributed lock manager (DLM). The distributed lock manager functions as a distributed semaphore and a distributed mutex in the distributed system. That is, each semaphore and each mutex managed by each workflow scheduler WFS is substituted with the distributed lock manager.

The task scheduler TS receives available resource information R5 from the resource manager RM. The available resource information R5 is information indicating total resources currently available in each computation node CN.

When the task scheduler TS receives the task execution request R2 from the workflow scheduler WFS, the task scheduler TS allocates predetermined resources to the predetermined computation node CN from a resource pool RP of the task group TG to which a task belongs with reference to the available resource information R5 with regard to the task designated with the task execution request R2. The task scheduler TS transmits a task execution request R3 to the resource manager RM.

The resource pool RP is a set in which two items of the computation node CN and the resources are paired. The details of the resource pool RP will be described later with reference to FIG. 5.

The task execution request R3 includes, for example, a task identifier with which a task can be uniquely identified in the task scheduler TS, a task name with which a task can be uniquely identified in the workflow, a script which is executed on the computation node CN at the time of execution of a task, and allocated resource information indicating resources allocated to the tasks by the task scheduler TS.

In one multi-workflow scheduling system, there may be a plurality of task schedulers TS. Each task scheduler TS may receive the task execution requests R2 from the plurality of workflow schedulers WFS.

The task scheduler TS is, for example, Mesos-compatible scheduler (Fenzo scheduler). Since the Fenzo scheduler is disclosed in, for example, "GitHub, Inc., "Home Netflix/Fenzo Wiki", [online], Oct. 14, 2016, [searched Jan. 5, 2018], the Internet <https://github.com/Netflix/Fenzo/wiki>", the detailed description thereof will be omitted herein.

When the resource manager RM receives the task execution request R3 for a task from the task scheduler TS, the resource manager RM updates the resource allocation state based on the allocated resource information included in the task execution request R3.

The resource manager RM transmits a task execution instruction R4 to the computation node CN designated with the allocated resource information included in the task execution request R3.

The task execution instruction R4 includes, for example, a task identifier with which a task can be uniquely identified in the resource manager RM, a task name with which a task can be uniquely identified in the workflow, a script which is executed on the computation node CN at the time of execution of a task, and allocated resource information indicating resources allocated to the tasks by the resource manager RM.

When the resource manager RM receives resource total amount information R6 or a task execution completion report R7 from each computation node CN, the resource manager RM updates the resource allocation state. The resource manager RM transmits the available resource information R5 to the task scheduler TS.

The resource total amount information R6 is information indicating the maximum amount of available resources of the computation node CN.

The task execution completion report R7 includes, for example, a task identifier with which a task can be uniquely identified in the resource manager RM and an execution result of a task. The execution result of the task is, for example, "success", "failure", and "interruption".

The resource manager RM is, for example, a Mesos Master program. Since the Mesos Master program is disclosed in, for example, "The Apache Software Foundation, "Apache Mesos-Architecture", [online], 2017, [searched Jan. 5, 2018], the Internet <http://mesos.apache.org/documentation/latest/architecture/>", the detailed description thereof will be omitted herein.

The computation node CN includes a CPU module and a memory module, as described above with reference FIG. 1. The computation node CN transits the resource total amount information R6 to the resource manager RM.

When the computation node CN receives the task execution instruction R4 from the resource manager RM, the computation node CN executes the task designated with the task execution instruction R4 using the resources designated with the task execution instruction R4. The computation node CN executing the task is designated with the task execution instruction R4.

When the computation node CN ends the execution of the task, the computation node CN transmits the task execution completion report R7 to the resource manager RM.

There may be a plurality of computation nodes CN. The plurality of computation nodes CN forms a computer cluster. The task may be executed on a Docker container. Since the Docker container is disclosed in, for example, "Docker Inc., "Docker-Build, Ship, and Run Any App, Anywhere", [online], 2017, [searched Jan. 5, 2018], the Internet <https://www.docker.com/>", the detailed description thereof will be omitted herein.

In the example of FIG. 4, the program PG includes, for example, the workflow manager WFM, the workflow scheduler WFS, the task scheduler TS, and the resource manager RM. The program PG may operate on the computation node CN. That is, the CPU 7 of the computation node CN may operate as the multi-workflow scheduling system by executing the program PG.

Figure 5:
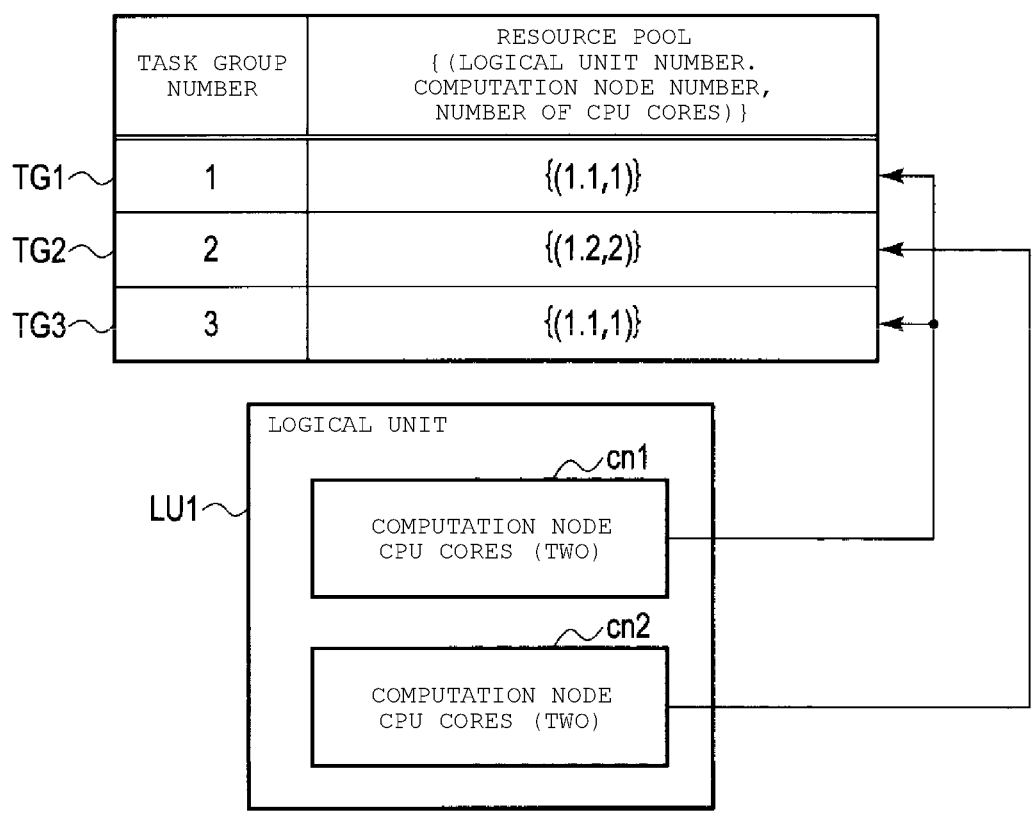
FIG. 5 is a diagram illustrating an example of a resource pool according to an embodiment.

FIG. 5 is a diagram illustrating an example of a resource pool according to an embodiment. More specifically, FIG. 5 illustrates a resource pool of each task group when the task groups are defined as described with reference to FIGS. 2 and 3.

For example, when the resources are CPU cores, the resource pool is expressed as "{(logical unit number.computation node number,number of CPU cores)}". "Logical unit number.computation node number" is referred to as a computation node ID. In the example of FIG. 5, a resource pool of task groups TG1 and TG3 is "{(1.1,1)}". This indicates that one core of a computation node cn1 of the logical unit LU with the logical unit number "1" is used. Similarly, a resource pool of the task group TG2 is "{(1.2, 2)}". This indicates that two cores of a computation node cn2 of the logical unit LU with the logical unit number "1" are used.

In the multi-workflow scheduling system according to an embodiment, the different resource pool may be exclusively allocated to each task group.

Figure 6:
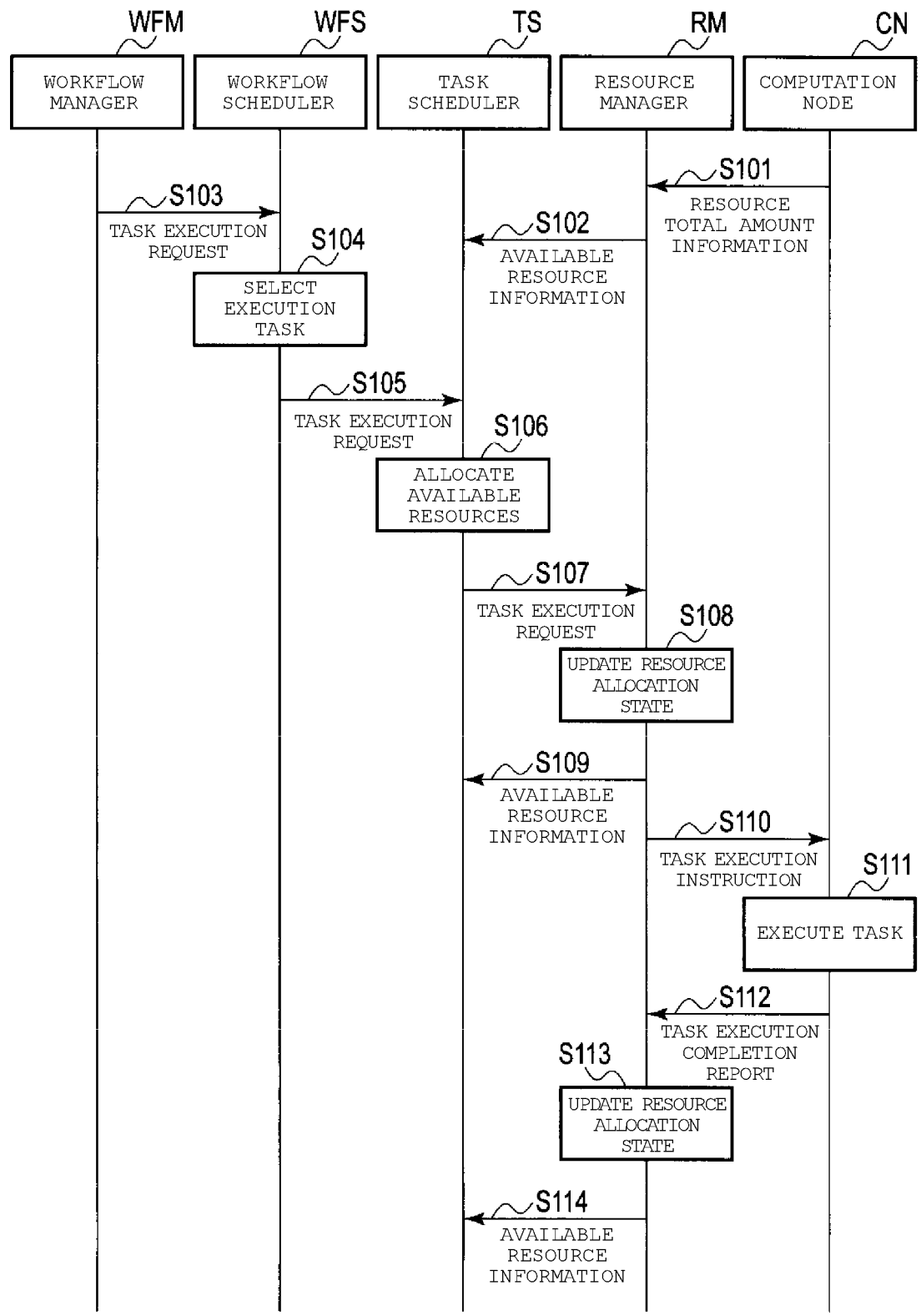
FIG. 6 is a diagram illustrating an example of a scheduling process according to an embodiment.

FIG. 6 is a diagram illustrating an example of a scheduling process according to an embodiment.

The computation node CN transmits the resource total amount information R6 to the resource manager RM (step S101). The resource manager RM updates a resource allocation state based on the received resource total amount information R6 and transmits the current available resource information R5 to the task scheduler TS (step S102).

The workflow manager WFM transits the task execution request R1 including the information regarding the executable task to the workflow scheduler WFS (step S103).

The workflow scheduler WFS selects the execution task among the task identifiers (or the task names) included in the task execution request R1 (step S104). The workflow scheduler WFS transmits the task execution request R2 including the information regarding the execution task to the task scheduler TS (step S105).

The task scheduler TS allocates the available resources to the execution task included in the task execution request R2 based on the available resource information R5 (step S106). The task scheduler TS transmits the task execution request R3 including the allocated resource information to the resource manager RM (step S107).

The resource manager RM updates the resource allocation state based on the allocated resource information included in the task execution request R3 (step S108). The resource manager RM transmits the available resource information R5 to the task scheduler TS based on the received allocated resource information and/or the resource allocation state managed by the resource manager RM (step S109). Then, the resource manager RM transmits the task execution instruction R4 to the computation node CN designated with the allocated resource information (step S110).

The computation node CN executes the task based on the received task execution instruction R4 (step S111). The computation node CN transmits the task execution completion report R7 to the resource manager RM after the task execution completion (step S112).

The resource manager RM updates the resource allocation state based on the received task execution completion report R7 (step S113). The resource manager RM transmits the available resource information R5 to the task scheduler TS based on the updated resource allocation state (step S114).

The processes of steps S101 and S102 may not be executed before step S103, but are preferably executed before the process of step S106. The processes of steps S101 and S102 may be executed asynchronously with the processes of steps S103 to S105.

FIG. 7 is a diagram illustrating a first example of a scheduling result according to an embodiment. More specifically, FIG. 7 illustrates a result obtained by executing the task scheduling using the multi-workflow scheduling system of two stages described above.

The workflow scheduling result W1 indicates a workflow which is a processing target for each task group and each period of time. A task scheduling result X1 indicates the task ID processed at each workflow and at each period of time and the computation node ID and the number of resources (herein, the number of CPU cores) used in the process. Here, task ID of the task name "T1" is t1, the task ID of the task name "T2" is t2, the task ID of the task name "T3" is t3, and the task ID of the task name "T4" is t4. A processing completion workflow Y1 indicates a workflow in which the computation is completed at the time of ending each period of time.

Processing results Z11 to Z16 indicate a workflow scheduling result W1, a task scheduling result X1, and a processing completion workflow Y1 at each time of elapse of the time T when periods of processing time are set to 0 to 6T.

In FIG. 7, for example, the number of workflows P is set to 4, the number of logical units N_lu is set to 1, the maximum value of the processing time of one task group T_max is set to T, and the total number of task groups G is set to 3. The types of tasks included in each workflow, the definition of the task group, and the resource pool are the same as those described with reference to FIGS. 2, 3, and 5. It is assumed that one logical unit LU includes two computation nodes, one computation node includes two cores 7, and a resource request amount of each task is 1 (that is, one CPU core is necessary for a process for one task).

The workflow scheduler WFS schedules the workflows so that N_lu (that is, one) workflow is processed in each task group TG at any time point. According to the workflow scheduling result W1 of each period of time, the number of workflows processed in the task groups TG1 to TG3 is 1.

More specifically, in the processing result Z11, one CPU core 7 of the computation node ID (1.1) is first allocated to the task with the task ID t1 of the task group TG1 and the workflow "1". Then, in the other workflows, since the tasks of the task group TG1 may not be processed, the other resources are in an unavailable state.

Subsequently, in the processing result Z12, one CPU core 7 of the computation node ID (1.2) is allocated to each of the tasks with the task IDs t2 and t3 of the task group TG2 and the workflow "1". In one workflow among the other workflows, since the tasks of the task group TG1 can be processed, for example, one CPU core 7 of the computation node ID (1.1) is allocated to the task with the task ID t1 of the task group TG1 and the workflow "2".

Further, in the processing result Z13, one CPU core 7 of the computation node ID (1.1) is allocated to the task with the task ID t4 of the task group TG3 and the workflow "1". In one workflow among the other workflows, since the tasks of the task group TG1 can be processed, for example, one CPU core 7 of the computation node ID (1.1) is allocated to the task with the task ID t1 of the task group TG1 and the workflow "3". In one workflow among the other workflows, since the tasks of the task group TG2 can be processed, for example, one CPU core 7 of the computation node ID (1.2) is allocated to each of the tasks with the task IDs t2 and t3 of the task group TG2 and the workflow "2".

In the processing result Z13, since the process of the workflow "1" is completed, the result is output as the processing completion WF. Similarly, in the processing results Z14 and Z15, the processing results of the workflows "1" to "4" are each output at each time of elapse of the time T and the process of all the workflows is completed at the processing time 6T. That is, the regular throughput is "1 workflow/T" and the whole processing time is 6T.

Here, the whole processing completion time at which computation is executed using Expression (3) is 6T. The regular processing throughput per T_max computed using Expression (2) is 1 workflow/T. Accordingly, the processing result satisfies target performance of both the whole processing completion time and the regular processing throughput.

FIG. 8 is a diagram illustrating a second example of a scheduling result according to an embodiment. More specifically, FIG. 8 illustrates a task scheduling result when the number N_lu of the logic unit LU is equal to 2 in the example of FIG. 7.

In FIG. 8, a workflow scheduling result W2, a task scheduling result X2, and a processing completion workflow Y2 for each period of time are illustrated as in FIG. 7. Processing results Z21 to Z24 indicate the workflow scheduling result W2, the task scheduling result X2, and the processing completion workflow Y2 at each time of elapse of the time T when periods of processing time are set to 0 to 4T.

In the example of FIG. 8, the configurations of types of tasks included in each workflow, definition of the task group, the number of workflows P, the maximum value of the processing time of one task group T_max, the total number of task groups G, a resource request amount of each task, and each logical unit LU are the same as those in FIG. 7. It is assumed that a resource pool allocated to the task group TG1 is "{(1.1,1), (2.1,1)}", a resource pool allocated to the task group TG2 is "{(1.2,2), (2.2,2)}", and a resource pool allocated to the task group TG3 is "{(1.1,1), (2.1,1)}".

The workflow scheduler WFS schedules the workflows so that N_lu (that is, two) workflows are processed in each task group TG at anytime point. According to the workflow scheduling result W2 of each period of time, the number of workflows processed in the task groups TG1 to TG3 is 2. In the example of FIG. 8, the number of workflows which can be processed at a time increases compared to the example of FIG. 7. Accordingly, the whole processing completion time decreases compared to the example of FIG. 7 and the regular processing throughput increases.

In the processing result Z23, since the process of the workflows "1, 2" is completed, the result is output as the processing completion WF. Similarly, in the processing result Z24, the processing results of the workflows "3, 4" are output and the process of all the workflows is completed at the processing time 4T. That is, the regular throughput is "2 workflows/T" and the whole processing time is 4T.

Here, the whole processing completion time at which computation is executed using Expression (3) is 4T. The regular processing throughput per T_max computed using Expression (2) is 2 workflows/T. Accordingly, the processing result satisfies target performance of both the whole processing completion time and the regular processing throughput.

Modification examples to the aforementioned embodiments will be described below. One of the examples uses an expanded WFDAG (super WFDAG), which is an expanded graph of the WFDAG described above.

In the expanded WFDAG, a task for executing workflow scheduling (hereinafter referred to as a workflow scheduling task) is used in addition to a task which is a processing unit described above (hereinafter referred to as a normal task). For the normal task, execution timing is controlled by the workflow scheduling task.

Figure 9:
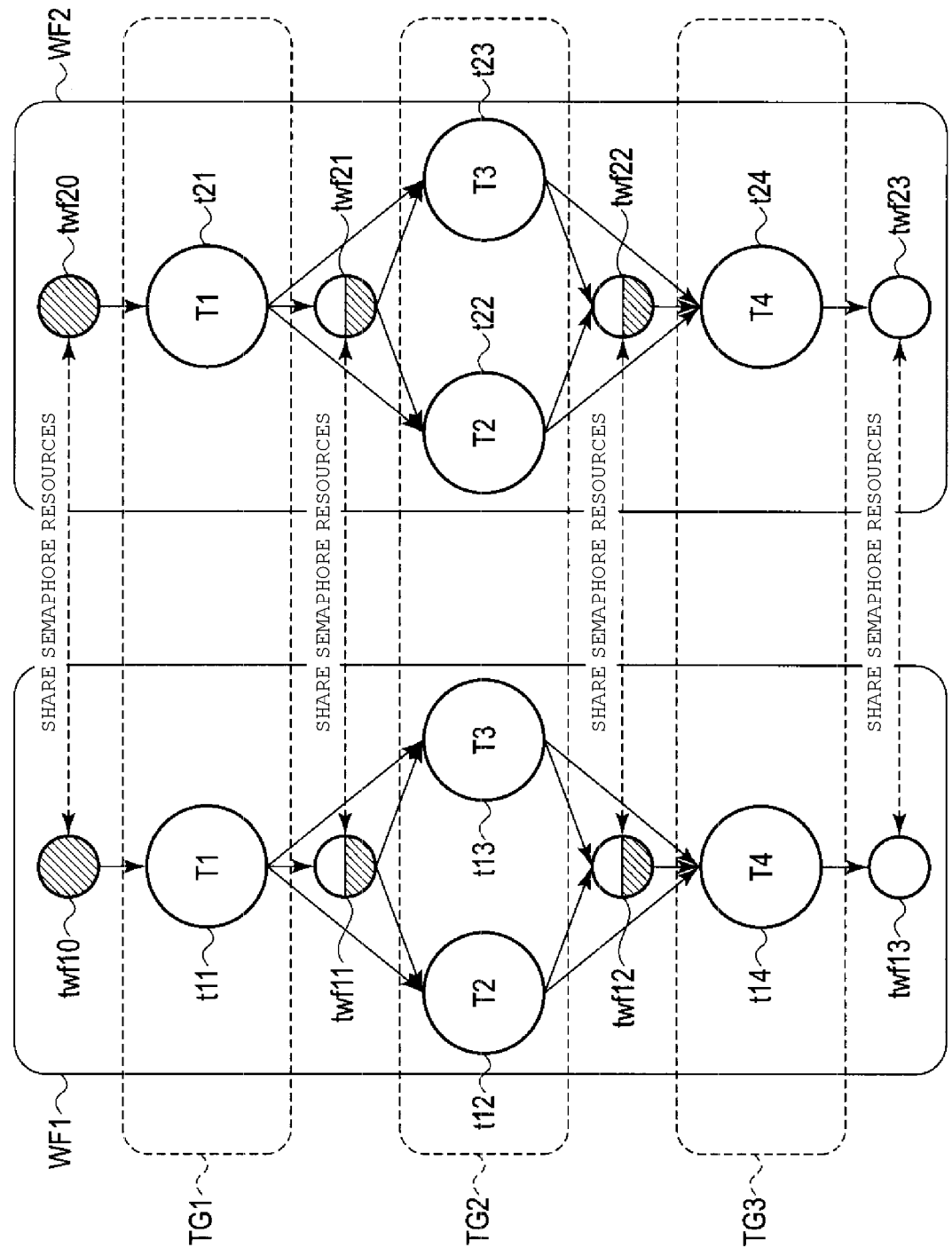
FIG. 9 is a diagram illustrating an example of an expanded WFDAG according to an embodiment.

FIG. 9 illustrates an example of the expanded WFDAG in which workflow scheduling task is added to each of the workflows WF1 and WF2 in FIG. 2.

The workflow scheduling tasks are arranged at an entrance and an exit of each task group. The workflow scheduling task arranged at the entrance of a task group executes the P command on a semaphore of the task group. In the workflow scheduling task arranged at the exit of a task group, the V command is executed for a semaphore of the task group.

Since the workflow scheduling task at the exit of a previous task group is adjacent to the workflow scheduling task at the entrance of a subsequent task group, these workflow scheduling tasks may be merged into one node (hereinafter referred to as a merged workflow scheduling task). The merged workflow scheduling task executes the V command on a semaphore of a front-stage task group TG and executes the P command on a semaphore of a rear-stage task group TG.

As illustrated in FIG. 9, there are the following three types of workflow scheduling tasks for each workflow. For example, an initial-stage workflow scheduling task twf10 is arranged at the entrance of the workflow WF1 and a final-stage workflow scheduling task twf13 is arranged at the exit of the workflow WF1. In addition, intermediate-stage workflow scheduling tasks twf11 and twf12 are arranged between task groups. Each intermediate-stage workflow scheduling task is, for example, a merged workflow scheduling task.

When there is a plurality of workflows described in the expanded WFDAG, the workflow scheduling tasks with the same task name share semaphore resources. For example, the initial-stage workflow scheduling tasks twf10 and twf20, intermediate-stage workflow scheduling tasks twf11 and twf21, intermediate-stage workflow scheduling tasks twf12 and twf22, and final-end workflow scheduling tasks twf13 and twf23 included in the workflows WF1 and WF2 share semaphore resources.

The workflow scheduling task is executed as in a normal task when the workflow scheduling task enters the executable state and the task scheduler TS is input. Here, the workflow scheduling is not executed on the workflow scheduling task. The workflow scheduling task does not belong to any task group TG.

The resources allocated to the workflow scheduling task may be distinguished from the resources allocated to each task group TG.

When the number of logical units N_lu is set to 1, a mutex can be used instead of the semaphore.

Figure 10:
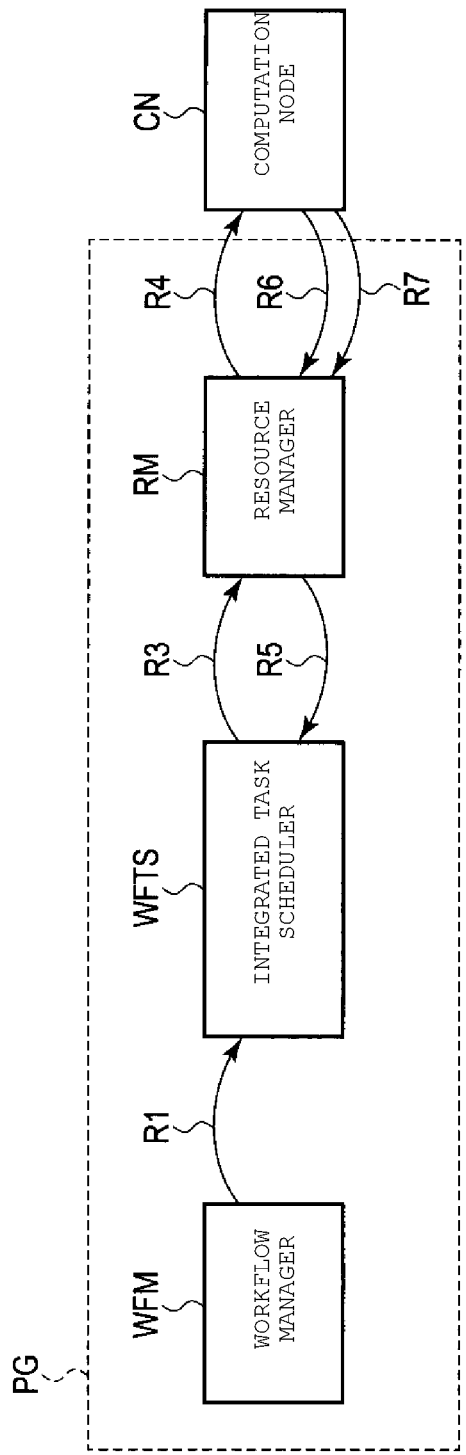
FIG. 10 is a diagram illustrating an example of a multi-workflow scheduling system according to an embodiment.

FIG. 10 is a diagram illustrating an example of the multi-workflow scheduling system according to an embodiment. The multi-workflow scheduling system according to an embodiment processes the workflow described in the expanded WFDAG. The description of the configuration repeated in FIG. 4 will be omitted.

The multi-workflow scheduling system includes the workflow manager WFM, an integrated task scheduler WFTS, the resource manager RM, and the computation node CN.

The workflow manager WFM manages a task state of the tasks included in each workflow based on the expanded WFDAG information. The workflow manager WFM transmits the task execution request R1 of the executable task of each workflow to the integrated task scheduler WFTS.

The workflow manager WFM is implemented by, for example, a snakemake program as in the workflow manager WFM of FIG. 4. In one multi-workflow scheduling system, there may be a plurality of workflow managers WFM.

The workflow manager WFM may automatically generate the expanded WFDAG information from the WFDAG information based on the task group definition table (see FIG. 3).

The integrated task scheduler WFTS is a scheduler in which the workflow scheduler WFS and the task scheduler TS in FIG. 4 are integrated.

The integrated task scheduler WFTS receives the available resource information R5 from the resource manager RM.

When the task execution request R1 is received from the workflow manager WFM, the integrated task scheduler WFTS selects the execution task from the tasks designated with the task execution request R1 and allocates predetermined resources of the predetermined computation node CN to the execution task with reference to the available resource information R5. When the integrated task scheduler WFTS allocates the resources, the integrated task scheduler WFTS may refer to the resource pool RP corresponding to the workflow scheduling task in the workflow scheduling task and may refer to the resource pool RP corresponding to the task group TG to which the tasks belong in the normal task.

Thereafter, the integrated task scheduler WFTS transmits the task execution request R3 to the resource manager RM.

In one multi-workflow scheduling system, there may be a plurality of integrated task schedulers WFTS. Each integrated task scheduler WFTS may handle the plurality of workflow managers WFM.

The integrated task scheduler is, for example, the above-described Fenzo scheduler.

Since the resource manager RM and the computation node CN are the same as those in FIG. 4, the description thereof will be omitted.

When the integrated task scheduler WFTS is on a plurality of OSs (that is, the integrated task scheduler WFTS operates on a distributed system), each computation node CN may further have a function of a distributed lock manager (DLM). The distributed lock manager supplies, for example, a distributed file lock command, and a distributed semaphore and a distributed mutex are implemented with a distributed file lock command.

Figure 11:
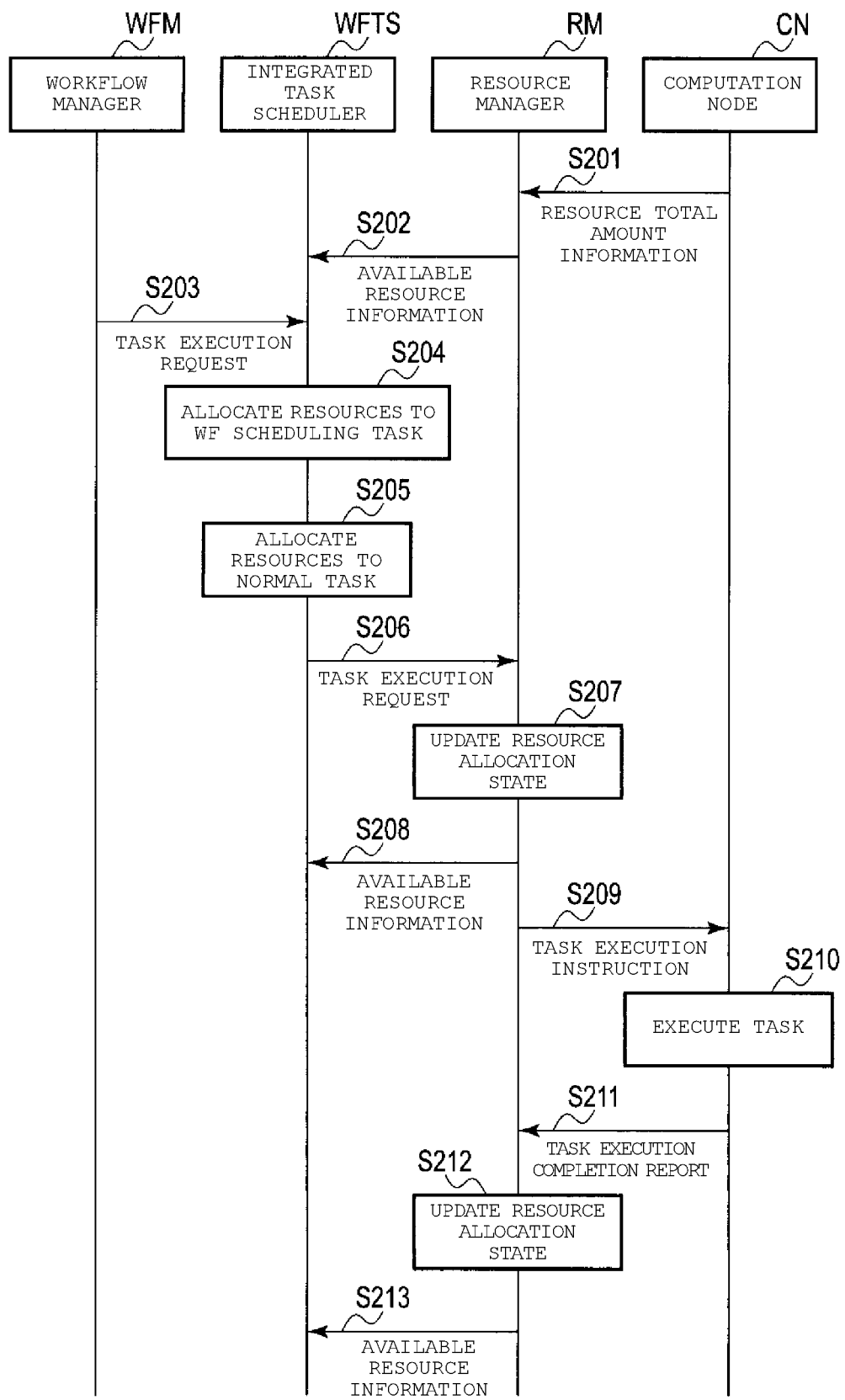
FIG. 11 is a diagram illustrating an example of a scheduling process according to an embodiment.

FIG. 11 is a diagram illustrating an example of a scheduling process according to an embodiment.

Since processes of steps S201 to S203 are the same as the processes of steps S101 to S103 of FIG. 6, the description thereof will be omitted. The processes of steps S201 and S202 may not be executed before step S203, but, in an embodiment, these processes are executed before the process of step S204. The processes of steps S201 and S202 may be executed asynchronously with the process of step S203.

When the integrated task scheduler WFTS receives the task execution request R1 from the workflow manager WFM, the integrated task scheduler WFTS identifies whether each task is the workflow scheduling task or the normal task by the task identifier (or the task name) included in the task execution request R1. The integrated task scheduler WFTS allocates the resources to the workflow scheduling task (step S204) and further allocates the resources to the normal task (step S205). The processing order of steps S204 and S205 may be reverse.

The integrated task scheduler WFTS selects the execution task from the workflow scheduling task and the normal task and transmits the task execution request R3 including the allocation resource information to the execution task to the resource manager RM (step S206).

Since the processes of steps S207 to S213 are the same as the processes of steps S108 to S114 of FIG. 4, the description thereof will be omitted.

Further modification examples to the aforementioned embodiments will be described below. In an embodiment, the workflow manager WFM and the workflow scheduler WFS in FIG. 4 are integrated into an integrated workflow manager WFMS (workflow manager and scheduler).

Figure 12:
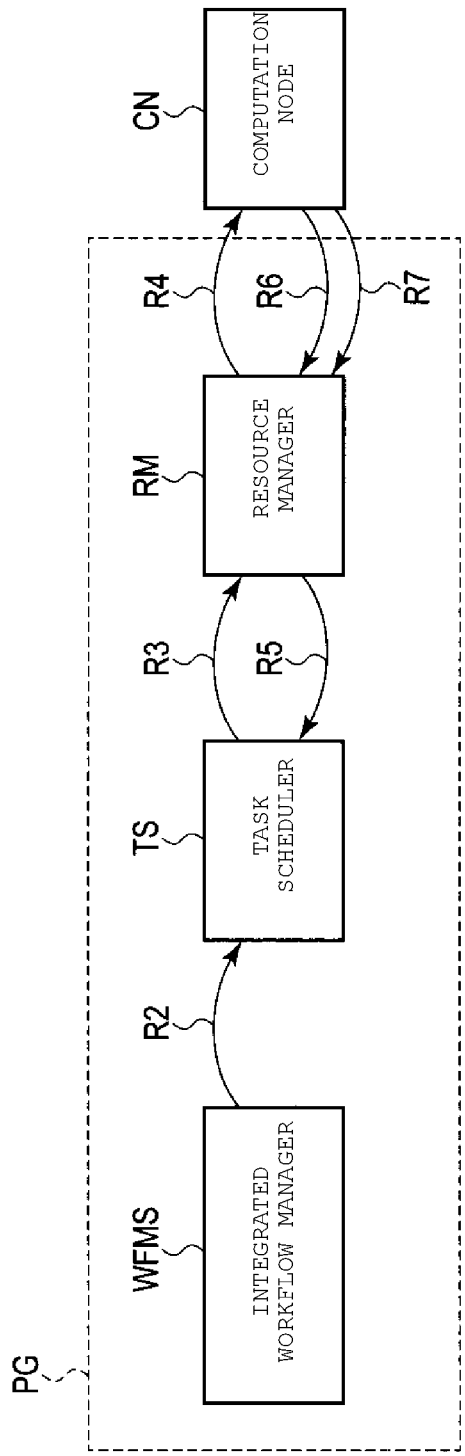
FIG. 12 is a diagram illustrating an example of a multi-workflow scheduling system according to an embodiment.

FIG. 12 is a diagram illustrating an example of a multi-workflow scheduling system according to an embodiment. The multi-workflow scheduling system according to an embodiment processes the workflow described in the expanded WFDAG as described above. The description of the configuration repeated in FIGS. 4 and 10 will be omitted.

The multi-workflow scheduling system includes an integrated workflow manager WFMS, the task scheduler TS, the resource manager RM, and the computation node CN.

The integrated workflow manager WFMS manages a task state of the tasks included in each workflow based on the expanded WFDAG information. The integrated workflow manager WFMS selects an execution task from the executable tasks and transmits the task execution request R2 to the task scheduler TS when the executable task of each workflow is a normal task. On the other hand, when the executable task is the workflow scheduling task, the workflow scheduling task is executed.

The integrated workflow manager WFMS is implemented by, for example, a snakemake program as in the workflow manager WFM of FIG. 4. In one multi-workflow scheduling system, there may be a plurality of integrated workflow managers WFMS.

The integrated workflow manager WFMS may automatically generate the expanded WFDAG information from the WFDAG information based on the task group definition table (see FIG. 3).

When the integrated workflow manager WFMS is on a plurality of OSs (that is, the integrated workflow manager WFMS operates on a distributed system), the integrated workflow manager WFMS may further have a function of a distributed lock manager (DLM). The distributed lock manager supplies, for example, a distributed file lock command, and a distributed semaphore and a distributed mutex are implemented with a distributed file lock command.

Since the task scheduler TS, the resource manager RM, and the computation node CN are the same as those of FIG. 4, the description thereof will be omitted.

Figure 13:
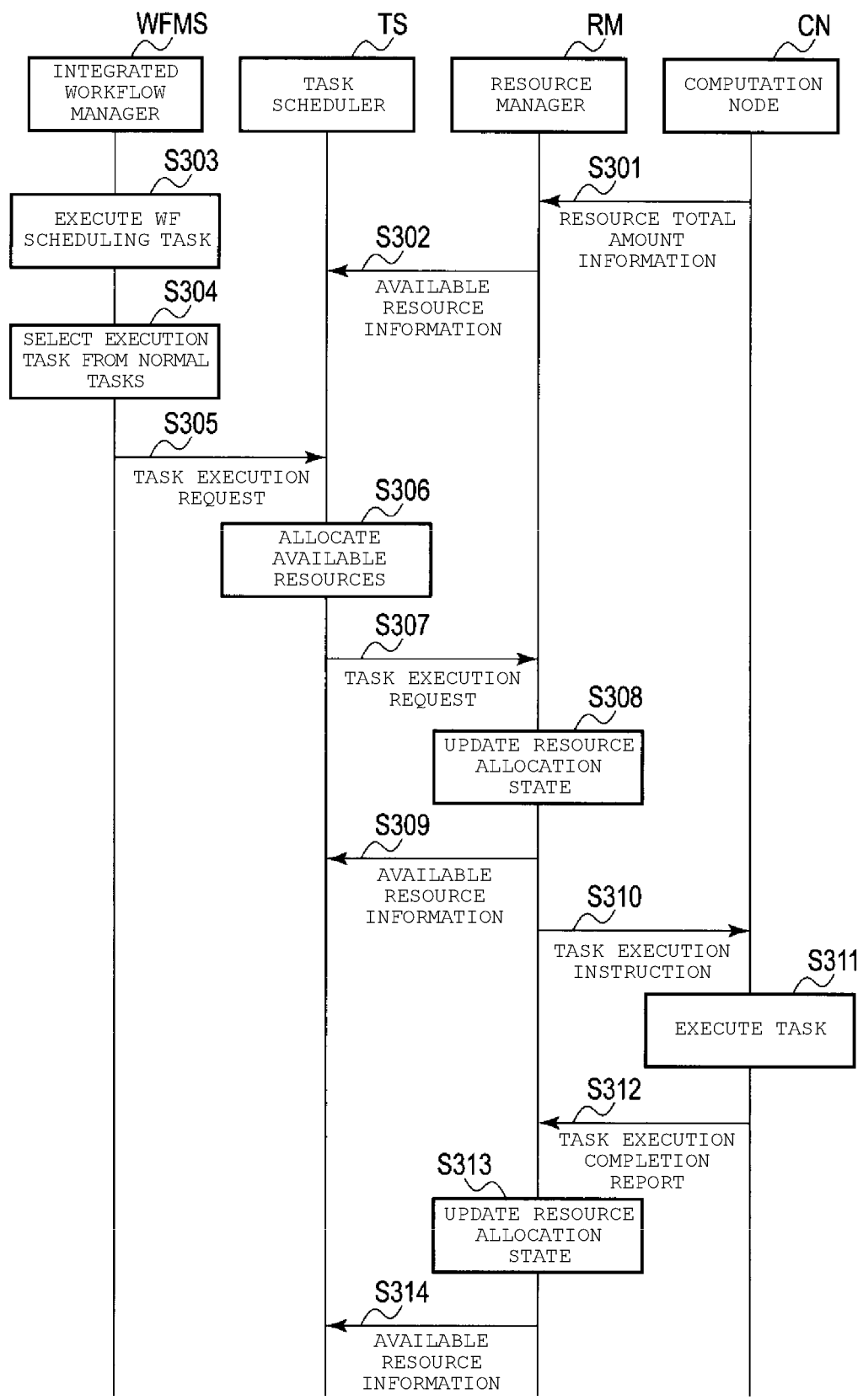
FIG. 13 is a diagram illustrating an example of a scheduling process according to an embodiment.

FIG. 13 is a diagram illustrating an example of a scheduling process according to an embodiment.

Since processes of steps S301 and S302 are the same as the processes of steps S101 and S102 of FIG. 6, the description thereof will be omitted. The processes of steps S301 and S302 may not be executed before step S305, but, in an embodiment, these processes are executed before the process of step S306. The processes of steps S301 and S302 may be executed asynchronously with the process of steps S303 to S305.

The integrated workflow manager WFMS manages a task state of the tasks included in each workflow and executes the workflow scheduling task when the workflow scheduling task can be executed (step S303). The integrated workflow manager WFMS selects the execution task from the normal tasks (step S304) and transmits the task execution request R2 including the information regarding the execution task to the task scheduler TS (step S305).

Since the processes of steps S306 to S314 are the same as the processes of steps S106 to S114 of FIG. 4, the description thereof will be omitted.

A method for implementing the aforementioned semaphore and the mutex will be described below. In an embodiment, the semaphore and the mutex are implemented with a file lock in which a flock command of Linux (registered trademark) is used.

Here, a format of the flock command is, for example, "flock [file name]-c 'script name'". Each workflow scheduling task acquires a file lock for "file name" by executing the command. A script designated with the "script name" is executed simultaneously with acquisition of the file lock.

When the file lock may not be acquired, the workflow scheduling task is stored in, for example, a file lock acquisition standby queue. When the execution of the script is completed, the file lock is released.

A ctr file, a que file, a sig file are defined for each task group as follows and are stored in, for example, the shared file system SFS.

The ctr file is a file that is used to operate a semaphore counter. The ctr file stores a semaphore counter value. An initial value of the semaphore counter value is, for example, the number of the logical units N_lu. When the mutex is used instead of the semaphore, the semaphore counter is not necessary. Therefore, the ctr file can be omitted.

The que file is a file that is used to operate a queue for acquisition standby of the file lock.

The sig file is a file that is used to report that processes for a slave task are all ended.

In an embodiment, Oracle Cluster File System ver.2 (OCFS2) may be used as the shared file system SFS. In OCSFS2, for example, to execute exclusive control, when the plurality of computation nodes CN simultaneously access a file on the shared file system SFS, a distributed file lock mechanism in which the distributed lock manager (DLM) is used is supplied. By using the above-described flock command in OCFS2, it is possible to access the distributed file lock mechanism on OCFS2. That is, the distributed semaphore and the distributed mutex are implemented on OCFS2 with the flock command.

Figure 14:
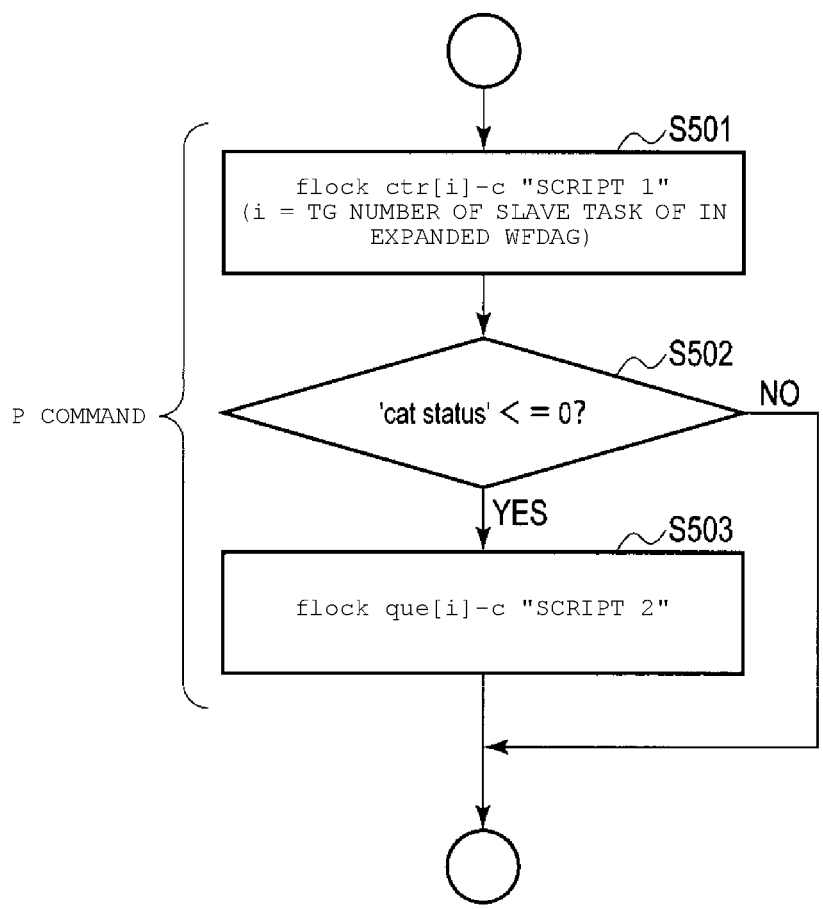
FIG. 14 is a flowchart illustrating a first example of a process of an initial-stage workflow scheduling task according to an embodiment.

FIG. 14 is a flowchart exemplifying a process of an initial-stage workflow scheduling task when the semaphore is used. The following processes of steps S501 to S503 are equivalent to the P command for the semaphore.

In step S501, the initial-stage workflow scheduling task executes, for example, a flock command "flock ctr[i]-c 'script 1'". An integer i indicates a task group number of the slave task in the expanded WFDAG and ctr[i] indicates a ctr file of the task group corresponding to the integer i.

In script 1, the initial-stage workflow scheduling task reads a semaphore counter value stored in the ctr file and decreases the semaphore counter value by 1. The decreased semaphore counter value is also stored in a file "status". The initial-stage workflow scheduling task writes the semaphore counter value in ctr.

In step S502, the initial-stage workflow scheduling task confirms a value of the file "status" generated in step S501 using a cat command, for example. The cat command is a command for reading content of the designated file. When the value of the file "status" is equal to or less than 0, the process ends. When the value of the file "status" is equal to or greater than 1, the process proceeds to step S503.

When the value of the file "status" is negative, the task in the task group is being executed in the workflow in the number of the logical unit N_lu. Accordingly, in this case, lock of the que file is necessary. When the value of the file "status" is negative, one or more workflows are in a lock release standby state of the que file.

In step S503, the initial-stage workflow scheduling task executes, for example, a flock command "flock que[i]-c 'script 2'". Here, que[i] indicates the que file of the task group corresponding to the integer i.

Script 2 detects whether the processes of the slave task are all completed. In script 2, the initial-stage workflow scheduling task periodically confirms whether the sig file is generated. When the sig file is generated, the initial-stage workflow scheduling task deletes the sig file and ends the process. When the sig file is not generated, the initial-stage workflow scheduling task stands by until the sig file is generated. The generation of the sig file will be described with reference to FIG. 15.

Figure 15:
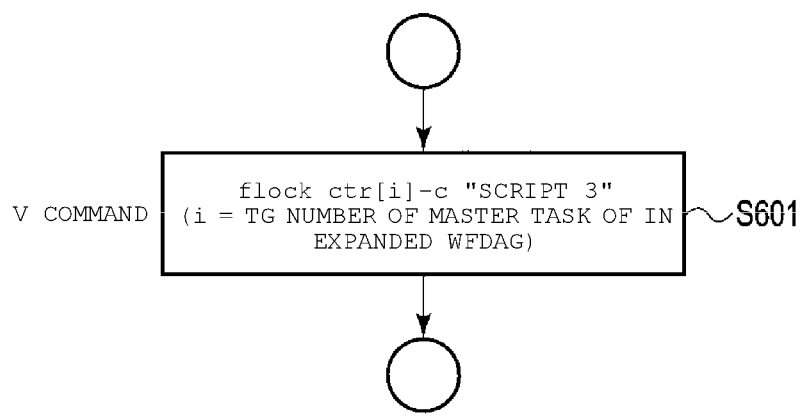
FIG. 15 is a flowchart illustrating a first example of a process of a final-stage workflow scheduling task according to an embodiment.

FIG. 15 is a flowchart exemplifying a process of the final-stage workflow scheduling task when the semaphore is used. The following process of step S601 is equivalent to the V command for the semaphore.

In step S601, the final-stage workflow scheduling task executes, for example, a flock command "flock ctr[i]-c 'script 3'". Here, ctr[i] indicates the ctr file of the task group corresponding to the integer i.

In script 3, the final-stage workflow scheduling task reads the semaphore counter value stored in the ctr file and increases the semaphore counter value by 1. When the increased semaphore counter value is equal to or less than 1, final-stage workflow scheduling task stands by until the sig file is generated and the sig file is deleted.

When the increased semaphore counter value is equal to or less than 1, there is the workflow in the lock release standby state of the que file. Therefore, the final-stage workflow scheduling task reports the processing completion to the workflow in which the above-described script 2 is being executed by generating the sig file. Thereafter, in script 2, after the sig file is deleted and the lock of the que file is released in accordance with the end of script 2, the lock of the head workflow in the que is released.

Figure 16:
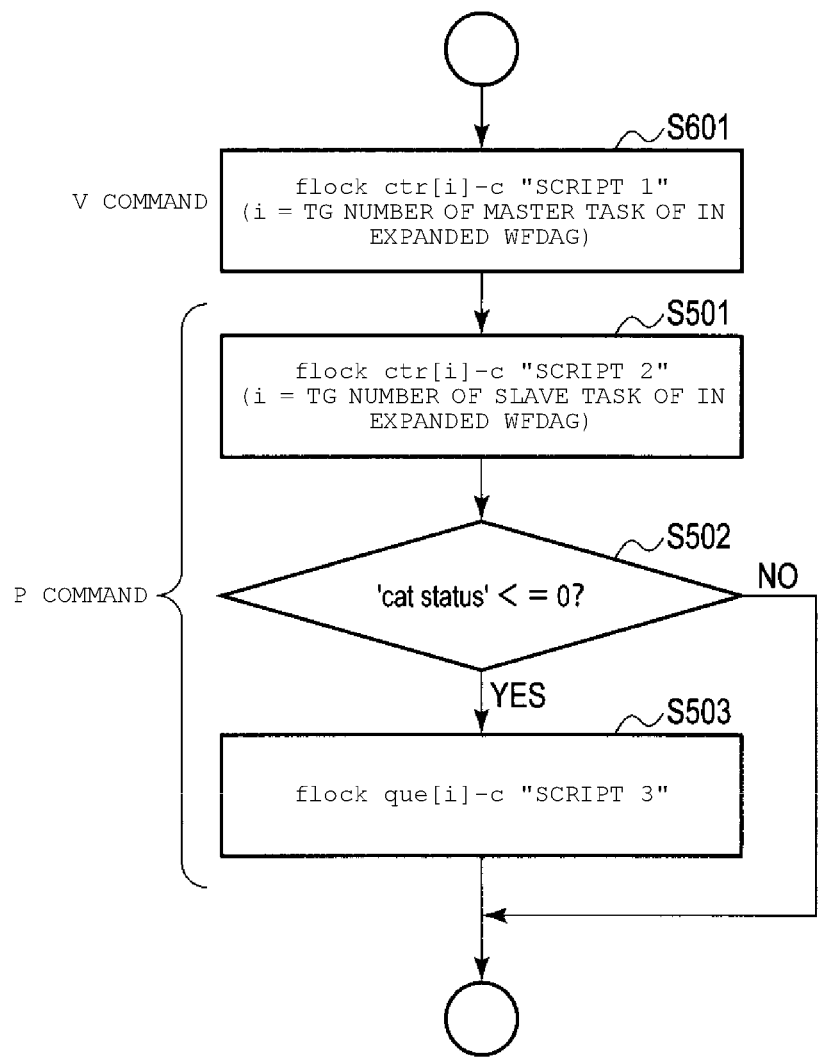
FIG. 16 is a flowchart illustrating a first example of a process of an intermediate-stage workflow scheduling task according to an embodiment.

FIG. 16 is a flowchart exemplifying a process of an intermediate-stage workflow scheduling task when the semaphore is used. The intermediate-stage workflow scheduling task is generated by combining the final-stage workflow scheduling task and the initial-stage workflow scheduling task, as described above.

Accordingly, in the intermediate-stage workflow scheduling task, the process (step S601) equivalent to the V command for the semaphore illustrated in FIG. 15 is first executed. Subsequently, the processes (steps S501 to S503) are executed, which is equivalent to the V command for the semaphore illustrated in FIG. 14.

Figure 17:
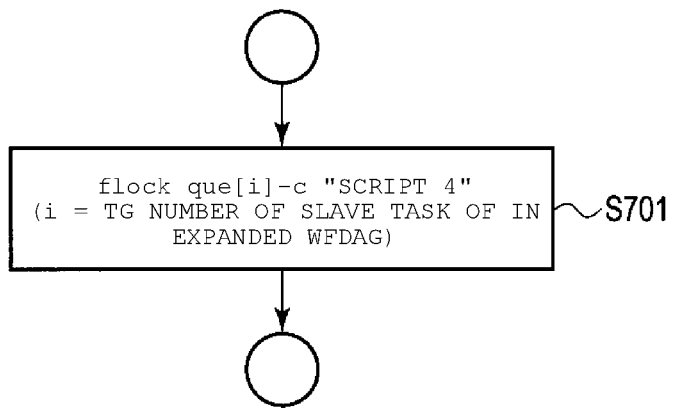
FIG. 17 is a flowchart illustrating a second example of a process of an initial-stage workflow scheduling task according to an embodiment.

FIG. 17 is a flowchart exemplifying a process of the initial-stage workflow scheduling task when the mutex is used.

In step S701, the initial-stage workflow scheduling task executes, for example, a flock command "flock que[i]-c 'script 4'".

In script 4, the initial-stage workflow scheduling task periodically confirms whether the sig file is generated. When the sig file is generated, the initial-stage workflow scheduling task deletes the sig file and ends the process. When the sig file is not generated, the initial-stage workflow scheduling task stands by until the sig file is generated.

Figure 18:
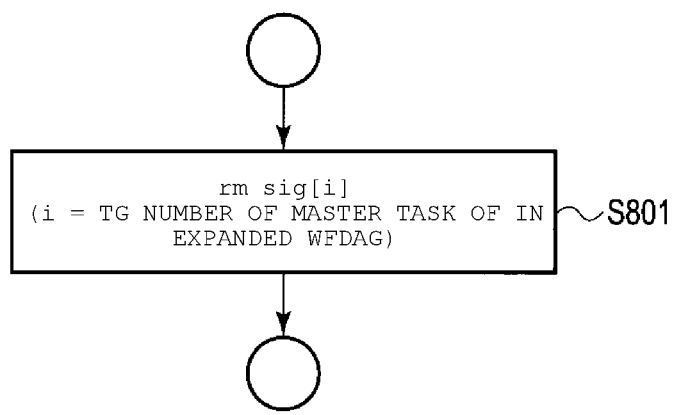
FIG. 18 is a flowchart illustrating a second example of the process of the final-stage workflow scheduling task according to an embodiment.

FIG. 18 is a flowchart exemplifying the process of the final-stage workflow scheduling task when the mutex is used.

In step S801, the final-stage workflow scheduling task executes, for example, a command "rm sig[i]" indicating that the sig file is detected. Here, sig[i] indicates the sig file of the task group corresponding to the integer i.

Figure 19:
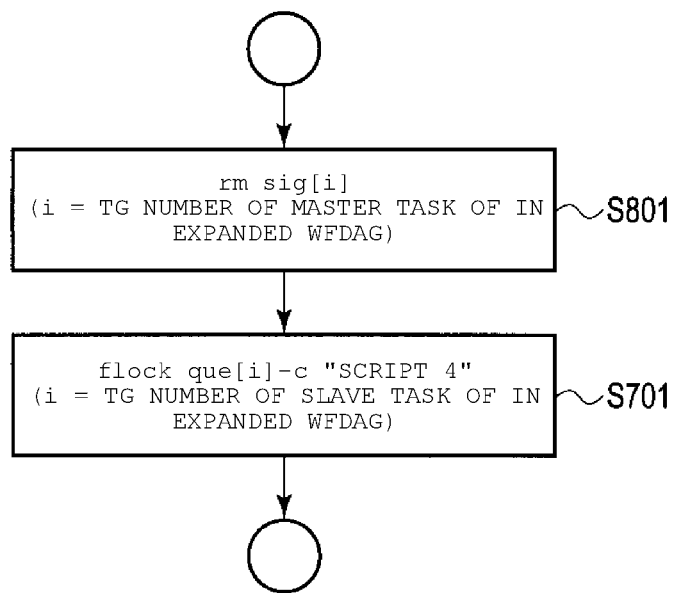
FIG. 19 is a flowchart illustrating a second example of the process of the intermediate-stage workflow scheduling task according to an embodiment.

FIG. 19 is a flowchart exemplifying the process of the intermediate-stage workflow scheduling task when the mutex is used.

As in FIG. 17, the intermediate-stage workflow scheduling task is a task in which the final-stage workflow scheduling task and the intermediate-stage workflow scheduling task are combined. That is, in the intermediate-stage workflow scheduling task, the process of step S801 is first executed. Subsequently, the process of step S701 is executed.

In the above-described embodiment, the semaphore and the mutex are implemented using a predetermined file system and a file lock command of an OS. Thus, the exclusive control can be simply implemented.

An example of an electronic apparatus for implementing the aforementioned multi-workflow scheduling system will be described below.

Figure 20:
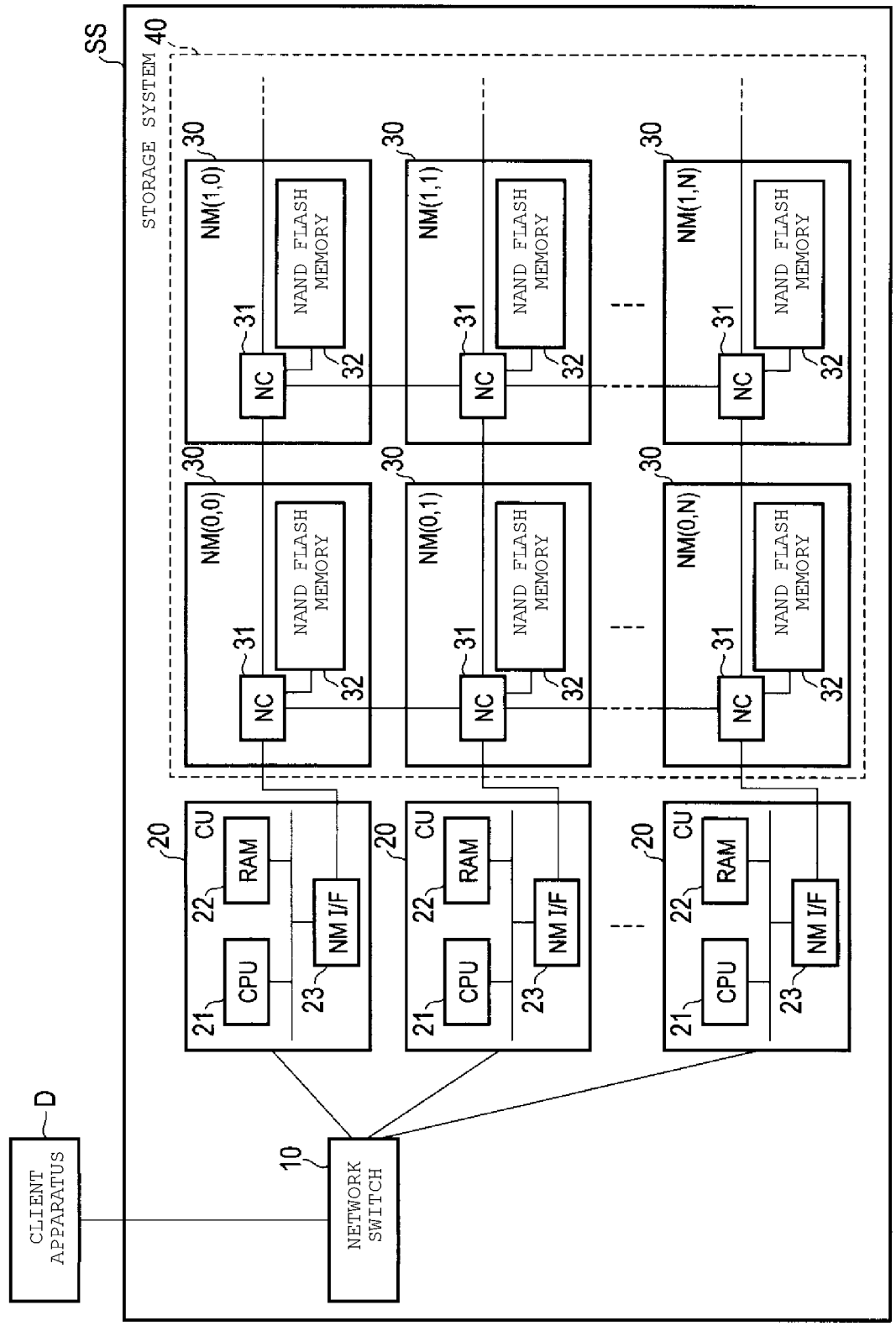
FIG. 20 is a block diagram illustrating an example of an electronic apparatus according to an embodiment.

FIG. 20 is a block diagram illustrating an example of the electronic apparatus according to an embodiment. The electronic apparatus can be implemented as, for example, a storage system SS. The storage system SS functions as, for example, a file server that writes data, reads data, updates data, and deletes data in response to requests from a client apparatus D connected via a network. As illustrated in FIG. 20, the storage system SS includes a network switch 10, a plurality of connection units (CUs) 20, and a plurality of node modules (NMs) 30.

The NM 30 includes a node controller (NC) 31, one or more NAND flash memories 32. The NC 31 executes access control to the NAND flash memory 32 and data transmission control. The NC 31 includes, for example, a 4-system input and output port. Thus, by connecting the NCs 31, the plurality of NMs 30 can be connected to each other, for example, in matrix form. By connecting the plurality of NMs 30 to each other, the storage system SS includes a large-capacity data storage region 40.

The CU 20 executes a process (including updating and deleting data) of inputting and outputting data to and from the data storage region 40 constituted in the above-described manner in response to requests from the client apparatus D. More specifically, a command to input or output data to or from a target NM 30 among the plurality of NM 30 is issued to correspond to a request from the client apparatus D. Hereinafter, a command to input or output data issued from the CU 20 to the NM 30 is simply referred to as a command.

The CU 20 includes a CPU 21, a RAM 22, and an NM interface 23. Each function of the CU 20 is stored in the RAM 22 and is implemented by a program executed by the CPU 21. The NM interface 23 executes communication with the NM 30, more specifically, the NC 31. The NM interface 23 is connected to the NC 31 of one NM 30 among the plurality of NMs 30. That is, the CU 20 is directly connected to one NM 30 via the NM interface 23 among the plurality of NMs 30 and is indirectly connected to the other NMs 30 via the NCs 31 of the NMs 30. The NM 30 directly connected to the CU 20 differs for each CU 20.

As described above, the CU 20 is directly connected to one NM 30 among the plurality of NMs 30. Accordingly, when the CU 20 issues a command to input or output data to or from the NM 30 other than directly connected NM 30, the command to input or output the data is first transmitted to the directly connected NM 30. Thereafter, the command to input or output the data is transmitted up to the target NM 30 via the NC 31 of each NM 30.

For example, when the NMs 30 are connected to each other in the matrix form and an identifier (M, N) is appended to each NM 30 in combination of a row number and a column number, the NC 31 can firstly determine whether the command to input or output the data is destined for the NM 30 by comparing the identifier of the NM 30 with the identifier designated as a transmission source of the command to input or output the data. When the command to input or output the data is not destined for the NM 30, the NC 31 can secondly determine to which NM 30 is transmitted among the adjacent NMs 30 based on a relation between the identifier of the NM 30 and the identifier designated as the transmission source of the command to input or output the data, more specifically, a magnitude relation of row and column numbers. A scheme of transmitting the command to input or output the data up to the target NM 30 is not limited to a specific scheme and any known scheme can be adopted. Originally, a route to the NM 30 not selected as a transmission destination can also be used as a reserved route.

A result of an input or output process in accordance with the command to input or output the data by the NM 30, that is, a result of access to the NAND flash memory 32, is also transmitted up to the CU 20 which is a issuing source of the command to input or output the data via some of the other NMs 30 by the function of the NC 31, as in the transmission of the above-described command to input or output the data. For example, as information regarding the issuing source of the command to input or output the data, the identifier can be designated as the transmission source of the processing result by including the identifier of the NM 30 to which the CU 20 is directly connected.

Further, The NC 31 separately has, for example, the 4-system input and output port to transmit an interruption request signal. As in the command to input or output the data and the processing result described above, a transmission route of the interruption request signal from the NM 30 to the CU 20 is dynamically determined.

The network switch 10 receives a request from the client apparatus D and transmits the request to one of the plurality of CUs 20. Typically, the network switch 10 distributes the request from the client apparatus D to the plurality of CUs 20 so that loads of the plurality of CUs 20 is equalized. Here, the example in which the network switch 10 is provided has been described, but one CU 20 operates as a master among the plurality of CUs 20 and may serve as the network switch 10. The network switch 10 transmits the processing result received from the CU 20 to the client apparatus D.

Figure 21:
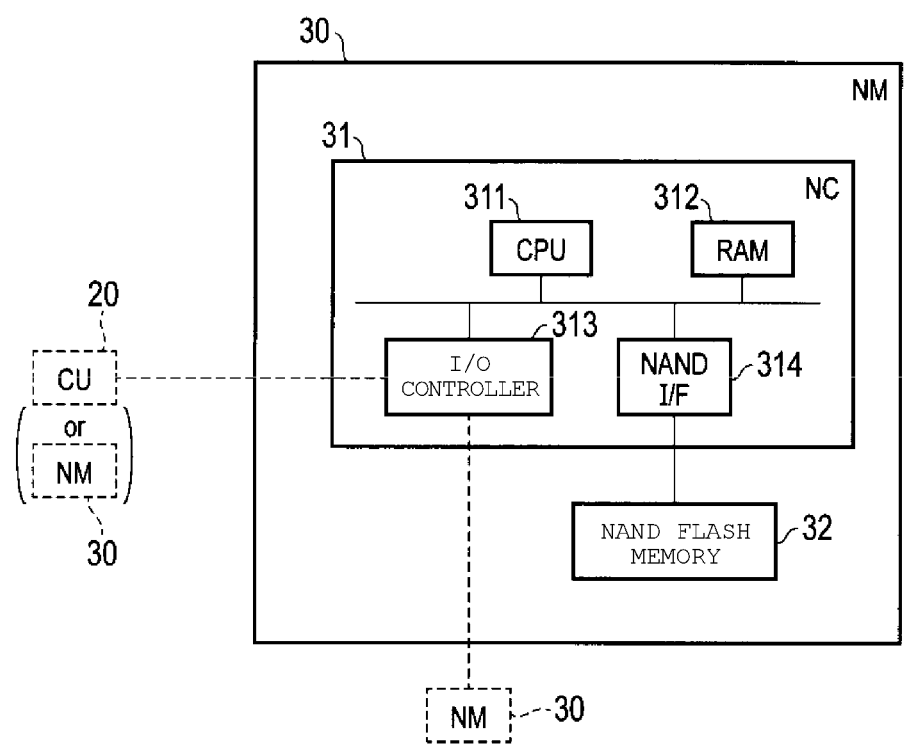
FIG. 21 is a block diagram illustrating a configuration of a node module (NM) installed in the electronic apparatus according to an embodiment.

FIG. 21 is a diagram illustrating an example of the configuration of the NM 30 (a detailed configuration of the NC 31).

As described above, the NM 30 includes the NC 31 and one or more NAND flash memories 32. As illustrated in FIG. 21, the NC 31 includes a CPU 311, a RAM 312, an I/O controller 313, and a NAND interface 314. Each function of the NC 31 is stored in the RAM 312 and is implemented by a program executed by the CPU 311. The I/O controller 313 executes communication with the CU 20 (more specifically, the NM interface 23) or another NM 30 (more specifically, the NC 31). The NAND interface 314 executes access to the NAND flash memory 32.

Incidentally, the computer system 1 illustrated in FIG. 1 can have a flexible configuration using the storage system SS and the client apparatus D described with reference to FIGS. 20 and 21. For example, the first node FN may be the client apparatus D, the switching apparatus SW may be the network switch 10, and the computation node CN may be the CU 20. One of the CUs 20 may serve as the first node FN and another CU 20 may operate as the computation node CN.

The first node FN may be omitted. In this case, the operation of the first node FN may be shared by the plurality of CUs 20. That is, the functions of the workflow manager WFM, the workflow scheduler WFS, the task scheduler TS, and the resource manager RM included in the program PG may be distributed to be executed by the CPUs 21 of the plurality of CUs 20.

That is, the storage system SS and the client apparatus D may be integrated as the computer system 1 and only the storage system SS may be provided in the computer system 1.

As described above, according to each embodiment, the computer system 1 includes the program PG implementing the multi-workflow scheduling system, at least one computation node CN, and the shared file system SFS. The logical unit LU is a computation unit including at least one computation node CN. The program PG includes the workflow manager WFM, the workflow scheduler WFS, the task scheduler TS, and the resource manager RM. In this configuration, the workflow scheduler WFM allocates the tasks to the computation nodes for each task group so that the number of workflows in which the tasks are simultaneously executed is restricted to a number equal to or less than the number of plurality of logical units LU. Accordingly, the regular processing throughput of the number of logical units LU per unit time can be ensured and the whole processing time can be reduced. Further, the processing amount can also correspond to different types of workflows without depending on the number of workflows and the definition of the workflows.

In the multi-workflow scheduling system according to an embodiment, the workflow scheduling task is defined in addition to the normal task. Thus, the integrated workflow manager WFMS or the integrated task scheduler WFTS can improve the processing efficiency of the computer system 1 since the exclusive control of the workflow process by the semaphore or the mutex can be executed as the task.

While certain embodiments and modification examples have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A workflow scheduling system comprising:
    a memory that stores information that defines a plurality of workflows each including a plurality of tasks, each of which is a normal task or a control task, and further defines a plurality of task groups each of which includes one or more tasks from one or more of the workflows;
    a first processor configured to schedule the plurality of workflows such that the control task is executed just before and after the normal task; and
    a plurality of second processors configured to form a predetermined number of logical computation units and execute the scheduled workflows in parallel,
    wherein the first processor is further configured to:
        allocate a first computer resource of the second processors to the control task and a second computer resource of the second processors that is different from the first computer resource to the normal task, and
        based on the stored information, instruct the second processors to execute the scheduled workflows while limiting a total number of the workflows simultaneously executed by the second processors to the predetermined number for each of the task groups.
2. The workflow scheduling system according to claim 1, wherein each of the task groups is a set of one or more tasks from two or more of the workflows.
3. The workflow scheduling system according to claim 1, wherein each of the task groups includes a series of tasks in a same workflow.
4. The workflow scheduling system according to claim 1, wherein each of the task groups includes tasks to be scheduled in parallel in a same workflow.
5. The workflow scheduling system according to claim 1, wherein
    the first processor is configured to:
        manage states of the tasks based on the stored information;
        select from the tasks a plurality of tasks that is ready for execution based on the managed states; and
        cause the second processors to execute the selected tasks.
6. The workflow scheduling system according to claim 5, wherein the workflows are defined by a workflow directed acyclic graph.
7. The workflow scheduling system according to claim 1, wherein the first processor is configured to schedule the workflows using a semaphore or a mutex for each of the task groups.
8. The workflow scheduling system according to claim 1, wherein the first processor is configured to schedule the workflows for each of the task groups, using a distributed semaphore configured with a distributed lock manager or using a distributed mutex configured with the distributed lock manager.
9. The workflow scheduling system according to claim 1, wherein the first processor and the memory are included in a first node, and the second processors are each included in a plurality of second nodes configured to communicate with the first node via a switching apparatus.
10. The workflow scheduling system according to claim 9,
    wherein each of the second processors has a plurality of processor cores, and
    the first processor is configured to schedule the workflows in units of processor cores.
11. The workflow scheduling system according to claim 1, wherein the first processor is configured to:
    manage states of normal tasks and control tasks based on the information;
    select a plurality of tasks that is ready for execution among the normal tasks and the control tasks based on the managed states; and
    cause the second processors to execute the selected tasks.
12. The workflow scheduling system according to claim 1,
    wherein the first computer resource is a first processor core of one of the second processors, and the second computer resource is a second processor core of one of the second processors other than the first processor core.
13. The workflow scheduling system according to claim 1,
    wherein the control task causes one of the second processors to execute a script which operates a distributed semaphore or a distributed mutex using a distributed file lock command implemented by a distributed lock manager.
14. The workflow scheduling system according to claim 13,
    wherein the distributed lock manager is provided by a file system with an Oracle Cluster File System Version 2 (OCFS2) format.
15. The workflow scheduling system according to claim 1, wherein the workflows are defined by an expanded workflow directed acyclic graph.
16. A workflow scheduling method comprising:
    storing information that defines a plurality of workflows each including a plurality of tasks, each of which is a normal task or a control task, and further defines a plurality of task groups each of which includes one or more tasks from one or more of the workflows;
    scheduling in parallel the workflows to a plurality of processors that form a predetermined number of logical computation units such that the control task is executed just before and after the normal task;
    allocating a first computer resource of the processors to the control task and a second computer resource of the processors that is different from the first computer resource to the normal task; and instructing the processors to execute the scheduled workflows while limiting a total number of the workflows simultaneously executed by the processors to the predetermined number for each of the task groups.

17. The workflow scheduling method according to claim 16, wherein each of the task groups is a set of one or more tasks from two or more of the workflows.

18. An electronic apparatus comprising:

a memory that stores information that defines a plurality of workflows each including a plurality of tasks, each of which is a normal task or a control task, and further defines a plurality of task groups each of which includes one or more tasks from one or more of the workflows; and a processor configured to schedule the workflows to be executed in parallel by a predetermined number of logical computation units formed by a plurality of processors, such that the control task is executed just before and after the normal task, wherein the processor is configured to:

allocate a first computer resource of the plurality of processors to the control task and a second computer resource of the plurality of processors that is different from the first computer resource to the normal task, and based on the stored information, instruct the plurality of processors to execute the scheduled workflows while limiting a total number of the workflows simultaneously executed by the plurality of processors to the predetermined number for each of the task groups.

* * * * *